United States Patent
Gamache et al.

(10) Patent No.: US 11,885,774 B2
(45) Date of Patent: Jan. 30, 2024

(54) CHROMATOGRAPHY VALVE FOR FLUID ANALYSIS

(71) Applicant: MÉCANIQUE ANALYTIQUE INC., Thetford Mines (CA)

(72) Inventors: Yves Gamache, Adstock (CA); André Lamontagne, Thetford Mines (CA); Frédéric Bédard, Thetford Mines (CA)

(73) Assignee: MÉCANIQUE ANALYTIQUE INC., Thetford Mines (CA)

( * ) Notice: Subject to any disclaimer, the term of this patent is extended or adjusted under 35 U.S.C. 154(b) by 529 days.

(21) Appl. No.: 17/058,017

(22) PCT Filed: May 31, 2019

(86) PCT No.: PCT/CA2019/050759
§ 371 (c)(1),
(2) Date: Nov. 23, 2020

(87) PCT Pub. No.: WO2019/227231
PCT Pub. Date: Dec. 5, 2019

(65) Prior Publication Data
US 2021/0199625 A1 Jul. 1, 2021

Related U.S. Application Data

(60) Provisional application No. 62/679,244, filed on Jun. 1, 2018.

(51) Int. Cl.
*G01N 30/20* (2006.01)
*B01D 15/10* (2006.01)
(Continued)

(52) U.S. Cl.
CPC ............ *G01N 30/20* (2013.01); *B01D 15/10* (2013.01); *F16K 11/0655* (2013.01);
(Continued)

(58) Field of Classification Search
CPC . B01D 15/10; F16K 11/0655; F16K 11/0743; F16K 49/00; F16K 49/002; G01N 2030/202208; G01N 30/20
See application file for complete search history.

(56) References Cited

U.S. PATENT DOCUMENTS 3,267,736 A 8/1966 Boettger
3,916,465 A 11/1975 Jones
(Continued)

FOREIGN PATENT DOCUMENTS

JP 2016031370 A 3/2016
JP 2016-173249 A 9/2016
WO 2006021071 A1 3/2006

OTHER PUBLICATIONS

Oxford Advanced Learner's Dictionary: cartridge (Year: 2023).*
(Continued)

*Primary Examiner* — David L Singer
(74) *Attorney, Agent, or Firm* — Christopher M. Scherer; DeWitt LLP

(57) ABSTRACT

A chromatography valve for use in fluid analysis and chromatography applications is provided. The valve includes a first body having passages extending therethrough and opening on a flat face of the first body at respective passage ports. The valve also includes a second body engaged with the first body in a sealed relationship, whereby one of the first and second bodies is movable relative to the other one between two or more positions for controlling fluid circulation through the passages. The second body includes at least one cartridge receiving cavity for receiving at least one cartridge removably provided therein. The cartridge has channel(s) for channeling fluid of pairs of the passage ports, depending on the position of the first body relative to the second body, thereby channeling fluid through selected ones of the pas-
(Continued)

sages via the at least one channel. A method of operating the valve is also provided.

23 Claims, 37 Drawing Sheets

(51) Int. Cl.
    *F16K 11/065*     (2006.01)
    *F16K 11/074*     (2006.01)
    *F16K 49/00*     (2006.01)

(52) U.S. Cl.
    CPC ........ *F16K 11/0743* (2013.01); *F16K 49/002* (2013.01); *G01N 2030/202* (2013.01); *G01N 2030/208* (2013.01)

(56) References Cited

U.S. PATENT DOCUMENTS

| | | | | |
|---|---|---|---|---|
| 6,193,213 | B1* | 2/2001 | Stearns | F16K 3/188 |
| | | | | 137/625.46 |
| 7,544,293 | B2 | 6/2009 | Oroskar et al. | |
| 8,931,519 | B2 | 1/2015 | Keene et al. | |
| 2004/0134546 | A1* | 7/2004 | Schick | B01L 3/502738 |
| | | | | 137/625.46 |
| 2006/0185419 | A1* | 8/2006 | Gamache | F16K 7/14 |
| | | | | 73/23.41 |
| 2007/0144594 | A1* | 6/2007 | Moon | F16K 11/074 |
| | | | | 137/625.46 |
| 2007/0212484 | A1* | 9/2007 | Li | C23C 16/4412 |
| | | | | 118/733 |
| 2009/0152481 | A1* | 6/2009 | Gamache | F16K 11/20 |
| | | | | 251/12 |
| 2012/0119127 | A1* | 5/2012 | Tower | F16K 3/08 |
| | | | | 251/304 |
| 2013/0206653 | A1 | 8/2013 | Brann | |
| 2013/0263649 | A1 | 10/2013 | Storch et al. | |
| 2014/0261811 | A1* | 9/2014 | Tanaka | F16K 11/0743 |
| | | | | 137/625.11 |
| 2014/0261815 | A1* | 9/2014 | Tanaka | F16K 31/041 |
| | | | | 137/625.21 |
| 2016/0025688 | A1* | 1/2016 | Gamache | F16K 27/0236 |
| | | | | 137/512.3 |
| 2018/0164259 | A1* | 6/2018 | Liu | B01D 15/22 |

OTHER PUBLICATIONS

Cambridge English Dictionary: cartridge (Year: 2023).*
International Search Report and Written Opinion for PCT/CA2019/050759 dated Jul. 29, 2019.
Search Report and Written Opinion for corresponding EP Patent Application No. 19812086.7 issued form the European Patent Office dated Feb. 11, 2022.
Office Action for corresponding JP Patent Application No. 2020-565800 issued form the Japanese Patent Office dated May 24, 2023.

* cited by examiner

CHROMATOGRAPHY VALVE FOR FLUID ANALYSIS

CROSS-REFERENCE TO RELATED APPLICATIONS

The present application is the U.S. national stage application of International Application No. PCT/CA2019/050759, filed May 31, 2019, which international application was published on Dec. 5, 2019, as International Publication No. WO2019/227231. The International Application claims priority to U.S. Patent Application No. 62/679,244, filed Jun. 1, 2018, the contents of which are incorporated herein by reference in their entireties.

TECHNICAL FIELD

The technical field generally concerns systems and methods related to chromatography valves, and more particularly to a chromatography valve with improved sealing properties.

BACKGROUND

Chromatographic valves exist in various types and configurations. Each of them having specific characteristics which make them more or less suitable for certain types of applications.

Rotary valves are more common as they can cover a very broad set of applications and are less expensive. They are the preferred choice at high temperatures since they do not suffer from flow derating like in typical GC-diaphragm valves. In a diaphragm valve, the diaphragm may lose its shape depending on the temperature at which they are operated. In contrast, rotary valves are typically made of a single, integral part, which keeps its shape regardless of temperature operating conditions. That said, rotary valves are more subject to wear, due to the high friction between the rotor and stator surfaces. The lifetime of rotary valves is highly dependent on the material of the parts used in their construction. As is known in chromatography, different materials are required to respect chemical compatibility between the samples being analyzed and the valve material. The material used for the valves components is typically dictated more by the application for which the valve is being used, than material durability. The stator and rotor interfaces in rotary valves are also difficult to seal properly. The seal is achieved by matching the rotor and stator's conical surfaces. Given the difficulty of properly machining two identical conical surfaces, high pressure is applied to the rotor's and stator's contact surfaces, to press them one against each other, so as to limit as much as possible leaks at the interface of the two parts. Applying this extra force results in more friction between the parts when actuating the valve, which reduces the life span of the valve. It is also not uncommon for a rotor to break over time due to this increased pressing force. This phenomenon is even worse at higher temperatures.

To solve issues related to rotary valves, diaphragm valves have been introduced. Diaphragm valves have a longer lifespan and provide better sealing performances, which is often required in critical applications such as UHP (Ultra High Purity) electronic gas analysis. In such diaphragm valves, communication between ports is blocked or allowed by pushing or retracting plungers on/from the diaphragm, which is typically made of a soft material such as plastic, Kapton, polyimide or any appropriate material. In order to achieve a good seal, plungers must be machined with very high precision and exceptional surface finish, relative to the diaphragm. The surface against which the plunger is pushed must be smooth and scratch free. Contrary to a rotary valve, obtaining a good surface finish on a flat surface is easier compared to a conical surface. One of the challenges with diaphragm valves is the adequate selection of the diaphragm material. It must be smooth enough to offer good sealing properties but hard enough to spring back when the plungers retract from it. Moreover, the diaphragm must maintain its shape and stiffness, regardless of the operating temperature of the valve. Since there is no perfect material, the diaphragm material must be selected amongst a large variety of compositions, so as to cover the broadest temperature spectrum possible. Given that chemical compatibility of the diaphragm with regard to the samples under analysis must also be taken into account, in addition to operating temperature, the selection of the proper diaphragm composition becomes quite complex. And regardless of material selection, diaphragms all suffer from temperature flow degradation over time, which is an issue for most applications.

Slide valves (also referred to as sliding valves) are also available for chromatographic applications. However, due to their design, they suffer from poor leak integrity and lifespan issues. With this type of valve, the seal is achieved by applying a pressing force to a part which is sandwiched between two other parts: the middle part and the sliding part. As the pressing force remains constant during actuation of the valve, sliding valves suffer from wear, resulting from the friction between fixed and moving parts. The surface area to be sealed is large, and it is difficult to machine wide areas with an even, smooth surface, and consequently the pressing force needed to properly seal two wide surfaces one against the other is high. Increasing the pressing/sealing force results in more scratches on the contact surfaces, which reduces the sealing integrity over time, and consequently reduces the lifespan of the sliding valves.

In light of the above, there is a need for an improved valve for reducing wear and friction during sliding of the valve. There is also a need for a valve that would be easier to manufacture, and/or which would allow for providing a good seal between the fixed/static and sliding/moving parts, and that would allow overcoming drawbacks related to the difficulty of manufacturing wide flat surfaces with high precision. There is also a need for a versatile valve that can be used for small volume applications, and possibly at lower cost.

SUMMARY

According to a first aspect, a chromatography valve for use in fluid analysis and chromatography applications is provided. The chromatography valve includes a first body having a flat face and being provided with passages extending therein. Each passage is connectable at an outer end to tubing, and terminates at an inner end in a passage port opening on said flat face. The chromatography valve further includes a second body engaged with the first body in a sealed relationship, wherein one of the first and second bodies is movable relative to the other one of the first and second bodies between two or more positions for controlling fluid circulation between the passages of the first body. The second body further includes at least one cartridge receiving cavity. The valve also includes at least one cartridge removably provided in the at least one cartridge receiving cavity of the second body, the at least one cartridge having at least one channel in fluid communication with a pair of the passage ports of the first body, depending on the position of the first body relative to the second body, thereby channeling fluid through selected ones of the passages via the at least one channel.

According to a possible embodiment, the at least one cartridge comprises a front face facing the flat face of the first body, and further comprises at least one annular lip protruding from the front face of the cartridge and surrounding the at least one channel, the annular lip being in contact and pressed against the flat face.

According to a possible embodiment, the at least one channel comprises a recess defined on the front face for establishing fluid communication between two passages of the first body.

According to a possible embodiment, the at least one channel extends within the cartridge and comprises a pair of cartridge ports at opposite ends of the channel, the cartridge ports opening on a front face of the cartridge and facing the passage ports for establishing fluid communication between two passages of the first body.

According to a possible embodiment, the chromatography valve further includes at least one annular lip shaped and configured to surround each or both of the cartridge ports.

According to a possible embodiment, the annular lips surrounding at least one pair of cartridge ports has an oval-shape, and wherein the annular lips surrounding another pair of cartridge ports is substantially circular.

According to a possible embodiment, the at least one cartridge comprises a rear face opposite the front face, the rear face being provided with a flex point for properly seating the at least one cartridge in the at least one cartridge receiving cavity.

According to a possible embodiment, the annular lip has tapered inner and outer sides, and an apex, the apex being in sealing contact with annular regions surrounding the passage ports of the first body, in selected ones of the two or more positions.

According to a possible embodiment, the annular lip is provided with an inert coating.

According to a possible embodiment, a sealing ring surrounding the passage ports and the at least one cartridge, thereby creating a sealed space between the first and second bodies.

According to a possible embodiment, the chromatography valve further includes an enclosure for enclosing the first body and/or the second body, and wherein the first body, the enclosure and/or the second body comprises a seal groove for receiving the sealing ring therein.

According to a possible embodiment, the passages comprise a purge inlet and a purge outlet, for purging impurities from the sealed space.

According to a possible embodiment, the purge outlet is wider than the remaining passage ports to mitigate internal pressurisation upon actuation of the valve.

According to a possible embodiment, the at least one cartridge comprises independent valve seats interconnected by a thinner linking element.

According to a possible embodiment, the channel has a cross-sectional V-shape or U-shape.

According to a possible embodiment, the chromatography valve further includes one or more heating element configured to heat the at least one cartridge and/or channel to vaporize fluid circulating therein.

According to a possible embodiment, the at least one cartridge comprises a sampling cartridge, and wherein the channel of the sampling cartridge comprises a sampling cavity.

According to a possible embodiment, the sampling cartridge comprises a concentrator provided in the sampling cavity for capturing particles of a fluid circulating through said cavity.

According to a possible embodiment, the at least one cartridge is arc shaped.

According to a possible embodiment, the at least one cartridge comprises a plurality of cartridges, and wherein the at least one cartridge receiving cavity of the second body comprises a plurality of cartridge receiving cavities for receiving a corresponding one of the plurality of cartridges.

According to a possible embodiment, the at least one cartridge comprises a single cartridge, and wherein the at least one cartridge receiving cavity comprises a single cartridge receiving cavity for receiving the single cartridge According to a possible embodiment, the single cartridge comprises a plurality of channels.

According to a possible embodiment, one or more of the channels are of different volumes for allowing the channels to be used as selected sample loops.

According to a possible embodiment, the chromatography valve includes a biasing device provided underneath the at least one cartridge for pushing the cartridge toward the first body.

According to a possible embodiment, the biasing device includes one or more springs and/or resilient polymeric pads.

According to a possible embodiment, the biasing device comprises a single resilient polymeric pad having a plurality of resilient portions for pushing the at least one cartridge toward the first body, each resilient portion of the resilient pad having respective resiliencies.

According to a possible embodiment, each of the at least one cartridge receiving cavity is respectively provided with a biasing device.

According to a possible embodiment, the second body comprises purge channels extending radially between adjacent channels.

According to a possible embodiment, the at least one cartridge comprises purge channels extending radially between adjacent channels.

According to a possible embodiment, the first body comprises a plurality of purge pockets defined on the flat face and facing the purge channels to allow fluid communication between an inner section and an outer section of the second body.

According to a possible embodiment, a single channel is in fluid communication with the passages of the first body at a given time to allow fluid analysis of a selected fluid circulated through selected ones of the passages of the first body.

According to a possible embodiment, the chromatography valve includes a pressing assembly adapted to press the first body and the second body against each other.

According to a possible embodiment, the pressing assembly comprises at least one of disk springs and Belleville washers, for pressing the first and second bodies against one another.

According to a possible embodiment, the chromatography valve includes pressure adjusting means, for varying the sealing force applied by the pressing assembly.

According to a possible embodiment, the chromatography valve includes an actuating assembly for moving one of the first and second bodies between the two or more positions.

According to a possible embodiment, the valve is a linear slide valve, and wherein the actuating assembly comprises a pneumatic actuator, operatively connected to one of the first and second bodies, for linearly moving the corresponding body against the other one.

According to a possible embodiment, the pneumatic actuator comprises a compression spring compressed by a pair of cams provided on each side of the second body, the cams being operatively connected to the second body via cam connectors.

According to a possible embodiment, the slide valve is a rotary slide valve, and wherein the second body comprises a disk plate and a rotor arm extending therefrom, the at least one cartridge receiving cavity being defined in the disk plate.

According to a possible embodiment, the second body comprises a disk plate receiving cavity, and wherein the disk plate is removably connected within the disk plate receiving cavity.

According to a possible embodiment, the actuating assembly comprises a rotary assembly operatively connected to the second body for rotatably sliding the disk plate against the first body.

According to a possible embodiment, the rotary assembly comprises a lever arm operatively connected to the rotor arm, for rotating said rotor arm relative to the first body.

According to a second aspect, a chromatography valve for use in fluid analysis and chromatography applications is provided. The valve includes a static body having a flat face, the static body being provided with passages extending therein, each passage being connectable at an outer end to tubing, and terminating at an inner end in a static port opening on said flat face. The valve also includes a slide body engaged with the static body in a sealed relationship, the slide body being slidable relative to the static body between two or more positions, for controlling fluid circulation between the passages of the static body. The slide body includes a slide face, with pairs of slide ports; and channels extending within the slide body, each channel connecting a corresponding pair of slide ports, each pair of slide ports facing two of said static ports of the static body. The slide ports are surrounded by an annular lip protruding from the slide face, the annular lip being in contact and pressed against the flat face of the static body, whereby moving the slide plate relative to the static body allows directing fluid through selected ones of the passages of the static body via the channels in the slide body.

According to a third aspect, a method of operating a chromatography valve for use in fluid analysis and chromatography applications is provided. The method includes the steps of slidably moving a movable assembly in a first position to align a plurality of channels with respective passage ports, thereby establishing fluid communication therebetween; injecting a sample fluid in a first passage port to define a sample flow path circulating through at least one channel; slidably moving the movable assembly in an intermediate position to interrupt fluid communication to and from the at least one channel, thereby isolating a predetermined volume of sample fluid within the channel; injecting a carrier fluid in a second passage port to define a carrier flow path, the carrier flow path being connected to a valve output; and slidably moving the movable assembly from the intermediate position to a second position to align the at least one channel with the second passage port to allow the carrier fluid to carry the predetermined volume of sample fluid toward the valve output.

According to a possible embodiment, the channels are defined in at least one cartridge removably inserted in the movable assembly.

According to a possible embodiment, the method further includes the step of heating the cartridge prior to slidably moving the movable assembly in the second position in order to vaporize the sample fluid circulated in the corresponding channel.

According to a possible embodiment, the method further includes the steps of detecting the linear or angular position of the movable assembly; and adjusting a sealing pressure applied on the movable assembly according to the detected position of the movable assembly.

According to a possible embodiment, the sealing pressure is reduced prior to slidably moving the movable assembly, and wherein the sealing pressure is increased when the movable assembly is in the first or second positions.

According to a possible embodiment, the sealing pressure is set based on the operating temperature of the valve.

According to a possible embodiment, one or more of the channels are used as internal sampling loops.

According to a possible embodiment, the method further includes the step of selecting the at least one cartridge according to the required volume of the sampling loop, the sampling loop volume corresponds to the volume of the corresponding channel.

According to a possible embodiment, one or more of the channels include circular cartridge ports, and wherein at least one of the channels includes oval cartridge ports such that fluid communication with the oval cartridge ports is not interrupted in the intermediary position.

According to a possible embodiment, the method further includes the step of concentrating the sample fluid circulating through the at least one channel.

According to a possible embodiment, the sample fluid is concentrated using a concentrator disposed in a cavity provided along the at least one channel.

Other features of advantages of the present invention will be better understood upon reading example implementations thereof, with reference to the appended drawings.

BRIEF DESCRIPTION OF THE DRAWINGS

FIG. 23A shows the movable assembly positioned to be used in a "sampling mode", FIG. 23B being positioned for use in a "vaporizing mode" and FIG. 23C being positioned for use in a "injection mode".

Figure 1A:
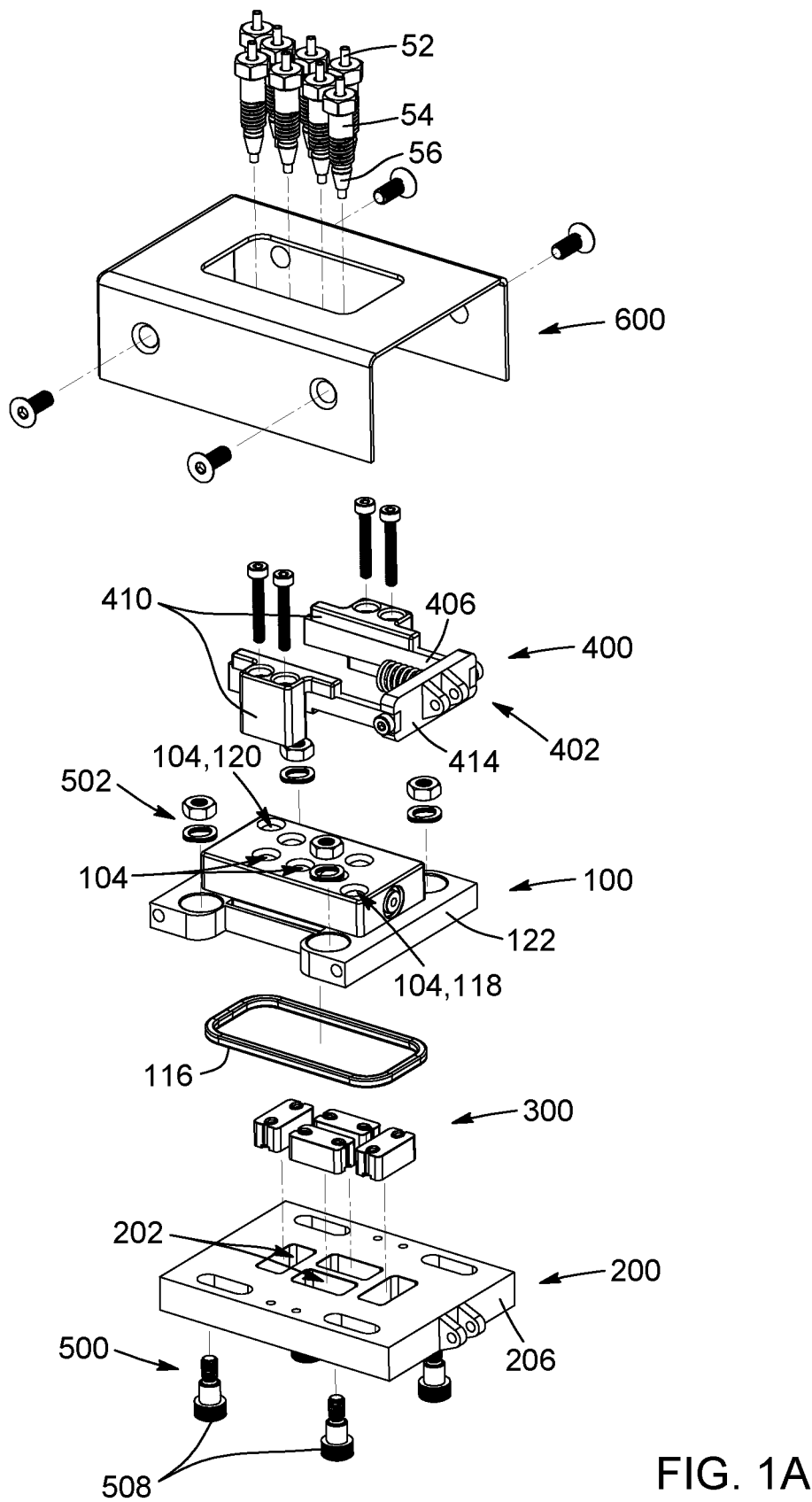
FIG. 1A is a top perspective and exploded view of a chromatography valve, according to a possible embodiment.

While the invention will be described in conjunction with example embodiments it will be understood that it is not intended to limit the scope of the invention to such embodiments. On the contrary, it is intended to cover all alternatives, modifications and equivalents as defined in the present application.

DETAILED DESCRIPTION

Within the following description, similar features of the drawings have been given similar reference numerals. To preserve the clarity of the drawings, some reference numerals have been omitted when they were already identified in a preceding figure.

The implementations described below are given by way of example only and the various characteristics and particularities thereof should not be considered as being limitative of the scope of the present invention. Unless otherwise indicated, positional descriptions such as "top", "bottom" and the like should be taken in the context of the figures and should not be considered as being limitative.

The present invention relates to a valve, and more specifically to a chromatography valve and its associated operating method. The chromatography valve according to the present invention can also be referred to as a "slide valve". By "slide valve", it is intended to encompass both linear and rotary slide valves. The chromatography valve includes many improvements, each of which can be implemented in the valve, independently from one another, or in combination. For example, the valve can include removable cartridges, or inserts, each of which can include at least two ports connected by a channel extending in the cartridge. The ports can be provided with annular lips or ridges, protruding about the aperture at its periphery, to reduce the area of contact between the static and moving components of the valve. In possible embodiments, the valve of the invention can include the annular lips on a "standard" plate, without the cartridges. Other embodiments of the valve can also include removable cartridges, without the annular lips. The invention will be better understood with the description of possible embodiments of the valve. While the different embodiments of the valve described below are a linear slide valve, and a rotary slide valve, it is understood that other types of sliding/movable valves are also possible.

Referring to FIGS. 1A to 5B, a first possible embodiment of a valve 10 is provided. In this case, the chromatography valve 10 is a linear slide valve. As best shown in FIG. 1A, the valve 10 includes a first body 100, a second body 200, cartridges (or inserts) 300, an actuating assembly 400, and a pressing/sealing assembly 500. When in use, the first body 100 is engaged with the second body 200 in a sealed relationship, whereby the first and second bodies are pressed against each other by the pressing assembly 500. An enclosure 600 surrounds and protects the different valve components.

Figure 1B:
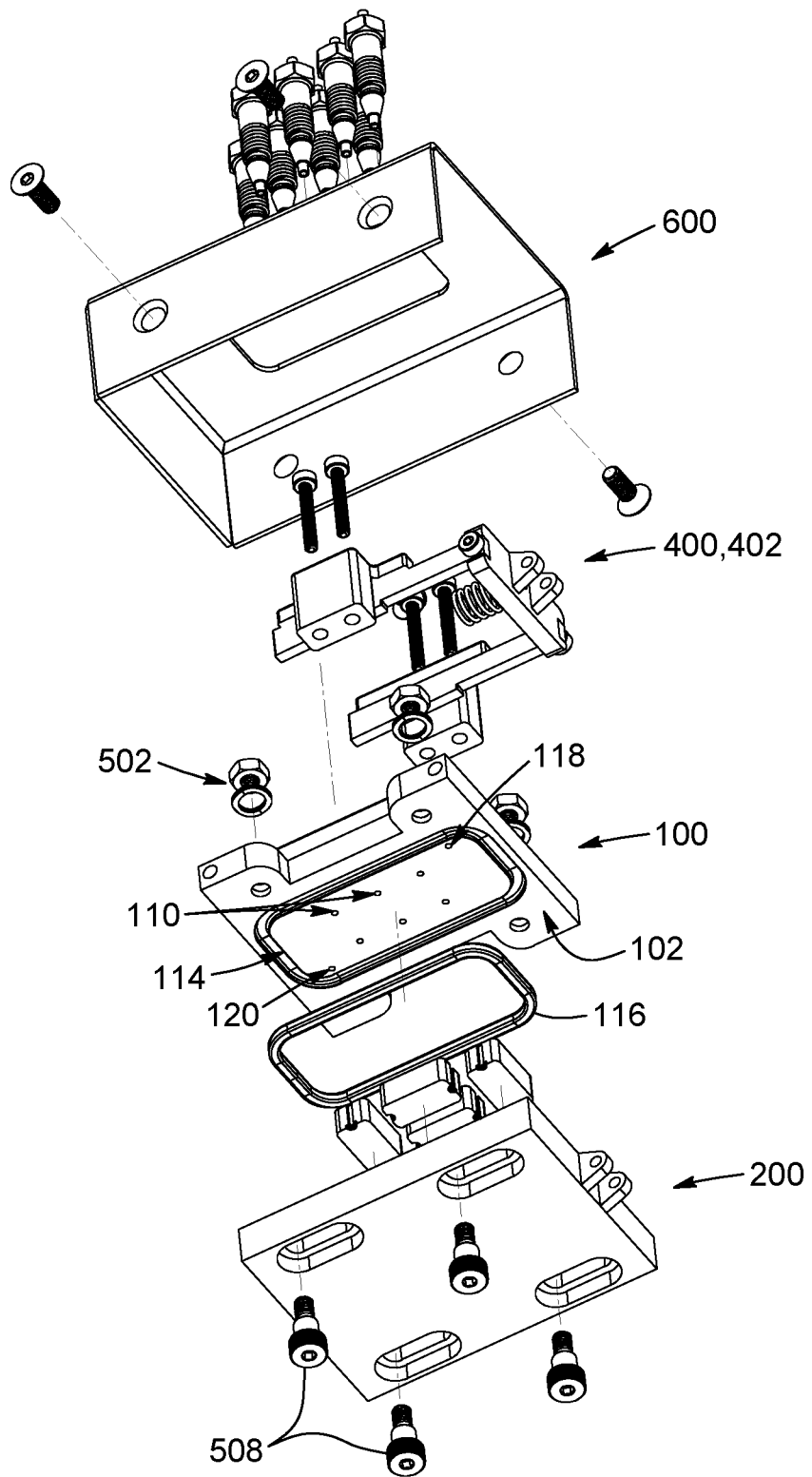
FIG. 1B is a bottom perspective and exploded view of the chromatography valve of FIG. 1A.
Figure 2:
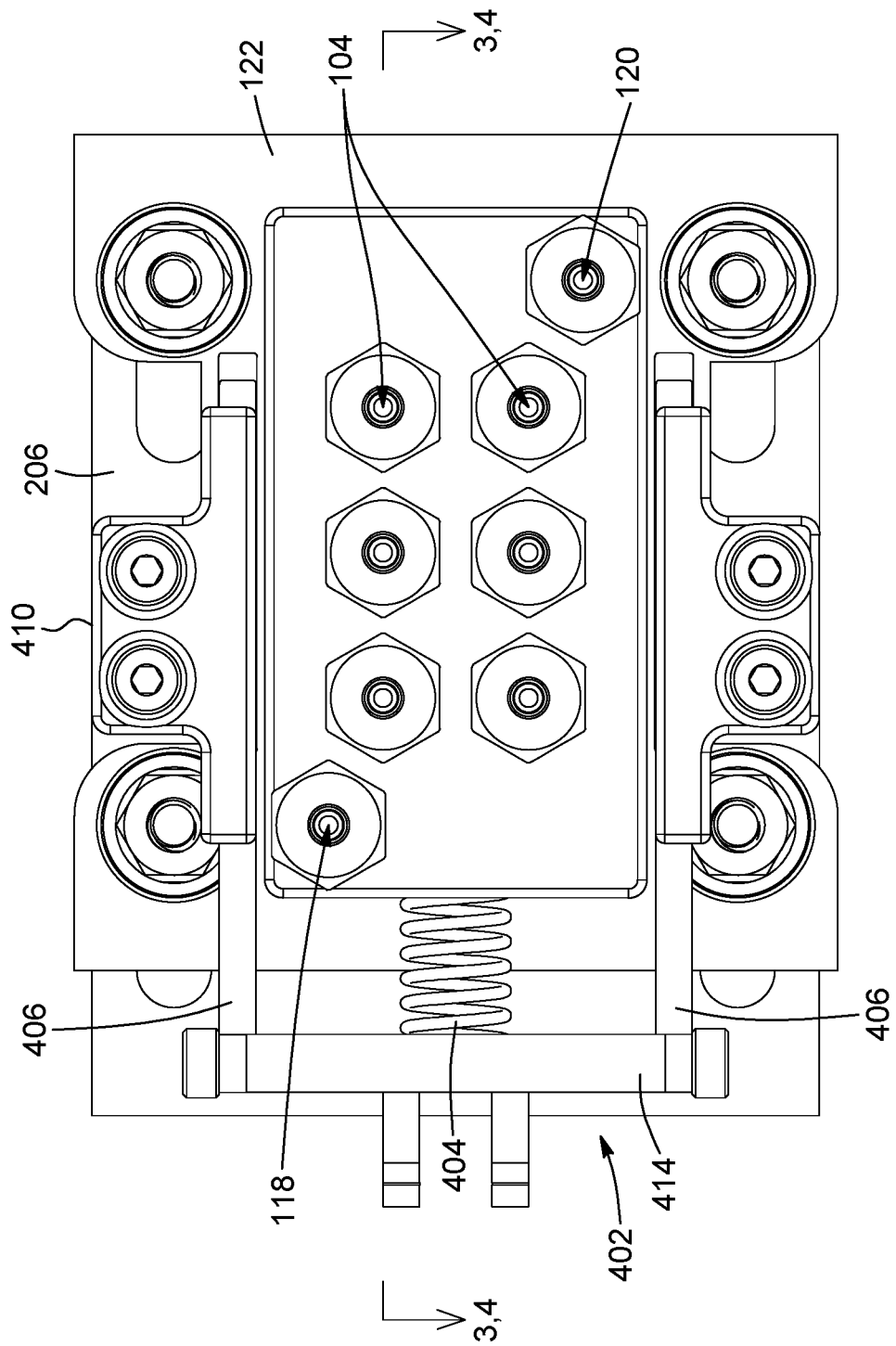
FIG. 2 is a top view of the valve of FIG. 1A, with the enclosure removed.
Figure 3:
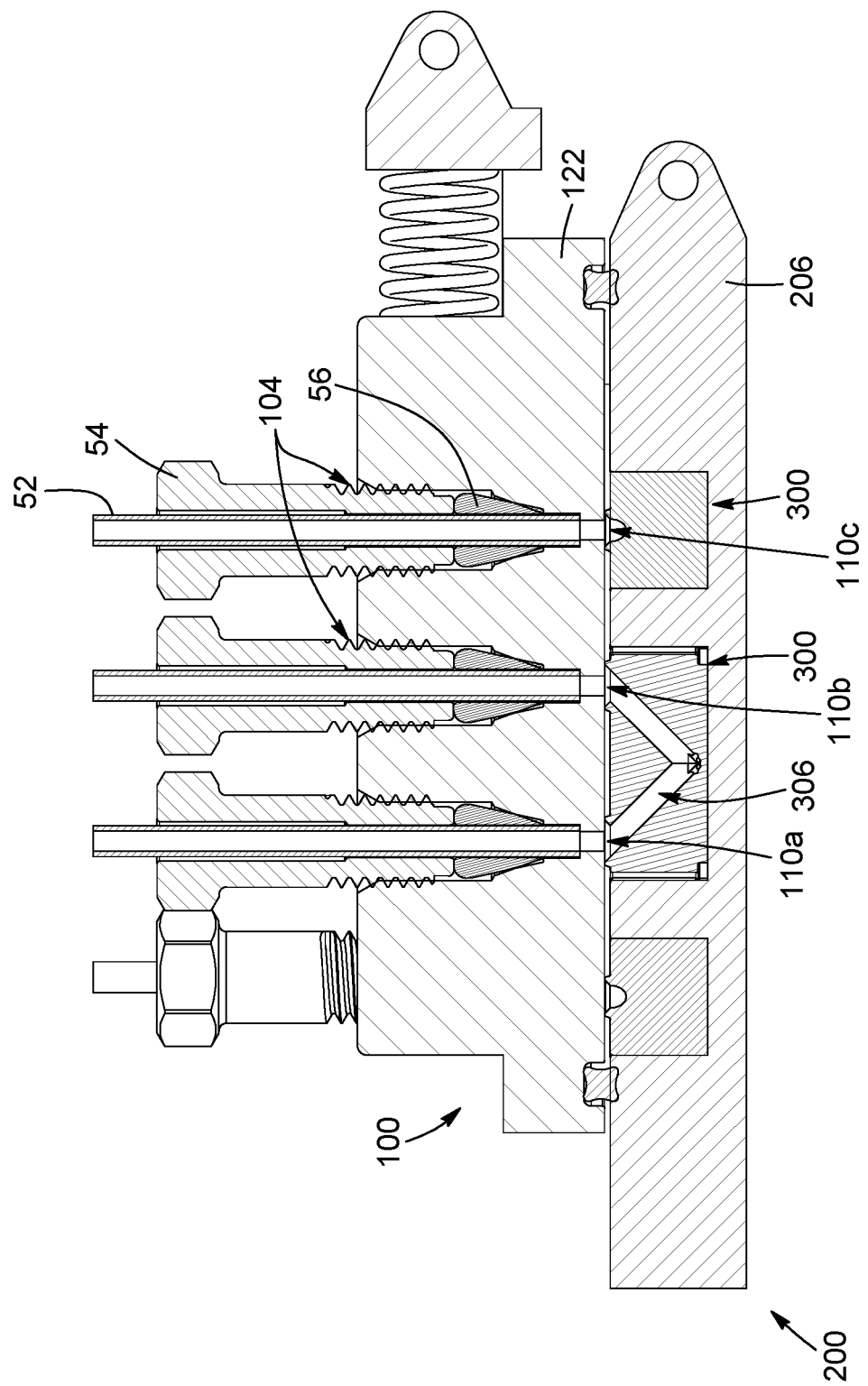
FIG. 3 is a cross-sectional view of the valve of FIG. 2, taken along line 3-3, showing a pair of passages in fluid communication with a channel provided in a second body.
Figure 4:
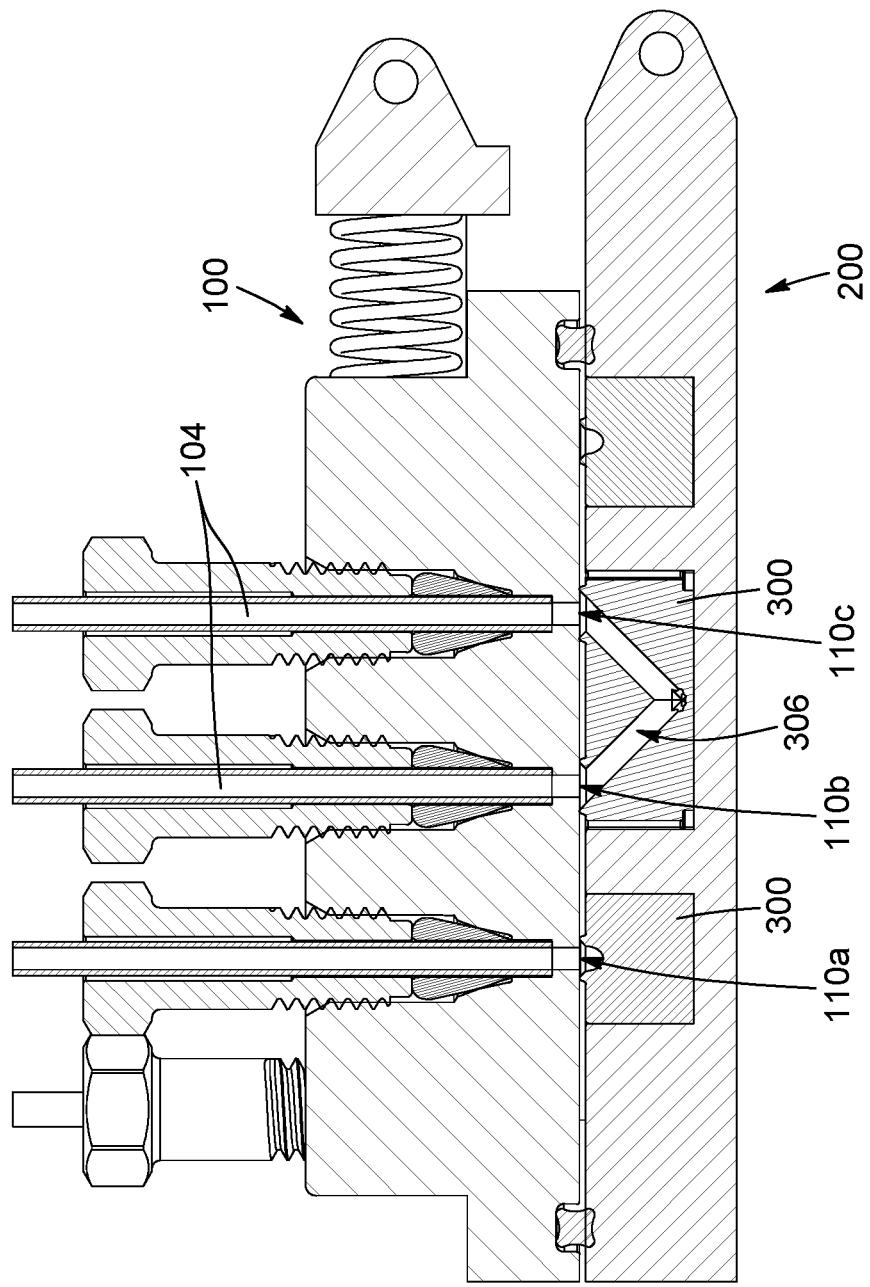
FIG. 4 is a cross-sectional view of the valve of FIG. 2, showing the second body in a second position such that the channel is in fluid communication with a different pair of passages.

Now referring to FIGS. 2 to 4, in addition to FIGS. 1A and 1B, the first body 100 includes an inner face 102, which is preferably flat. The inner face 102 of the first body interacts or cooperates with the second body 200. In the present embodiment, the first body 100 is made of a single plate 122, although it is possible to manufacture the first body with a plurality of components/parts.

As seen in FIGS. 3 and 4, passages 104 are provided in the first body 100. Each passage 104 can receive a tube 52, which can be maintained in place with a threaded nut 54 and a ferrule 56. The passages 104 terminate on the flat face 102 of the first body 100, as a passage port 110 (FIG. 1B). In the illustrated embodiment of FIGS. 1A to 5B, the valve 10 includes eight passages: six passages being usable as sample and/or carrier passages, ending in three pairs of passage ports 110; and two passages are used as purge passages, to circulate a purging fluid. The two purge passages respectively include a purge inlet 118, and a purge outlet 120 (identified on FIG. 1B). In the present embodiment, the first body 100 is substantially static (i.e., a static body), while the second body is a movable/slidable assembly 200.

Figure 27:
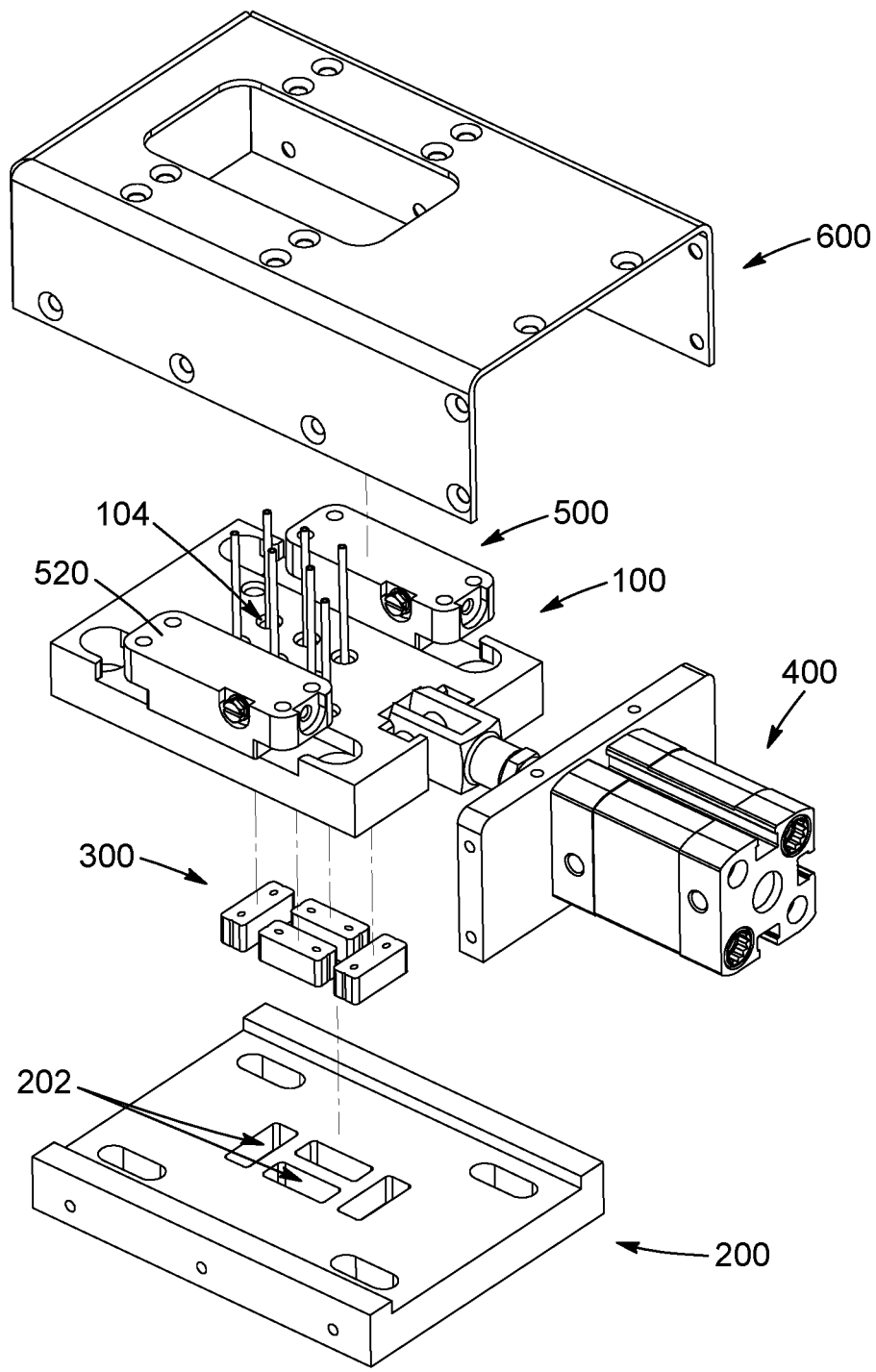
FIG. 27 is an alternate embodiment of the valve of FIG. 1, showing an actuating assembly connected to a first body.

However, it is appreciated that, in alternative embodiments, the first body 100 can be movable while the second body 200 can be substantially static. For example, FIG. 27 illustrates an alternative embodiment of the linear slide valve 10. In this embodiment, the actuating assembly 400 is operatively connected to the first body 100, and the second body 200 is fixedly connected to the enclosure 600. Therefore, it is appreciated that the passages 104 are moved relative to the cartridges 300 provided in the second body 200. Additionally, the sealing assembly 500 includes pneumatic actuators 520 provided on either side of the first body 100 and being configured to provide a downward force, thereby pressing the first body 100 against the second body 200 when required. In some embodiments, the sealing assembly 500 can be configured to only apply downward pressure when the valve is in an operating position, and to alleviate the applied pressure when sliding the first body 100 via the actuating assembly 400.

Figure 5:
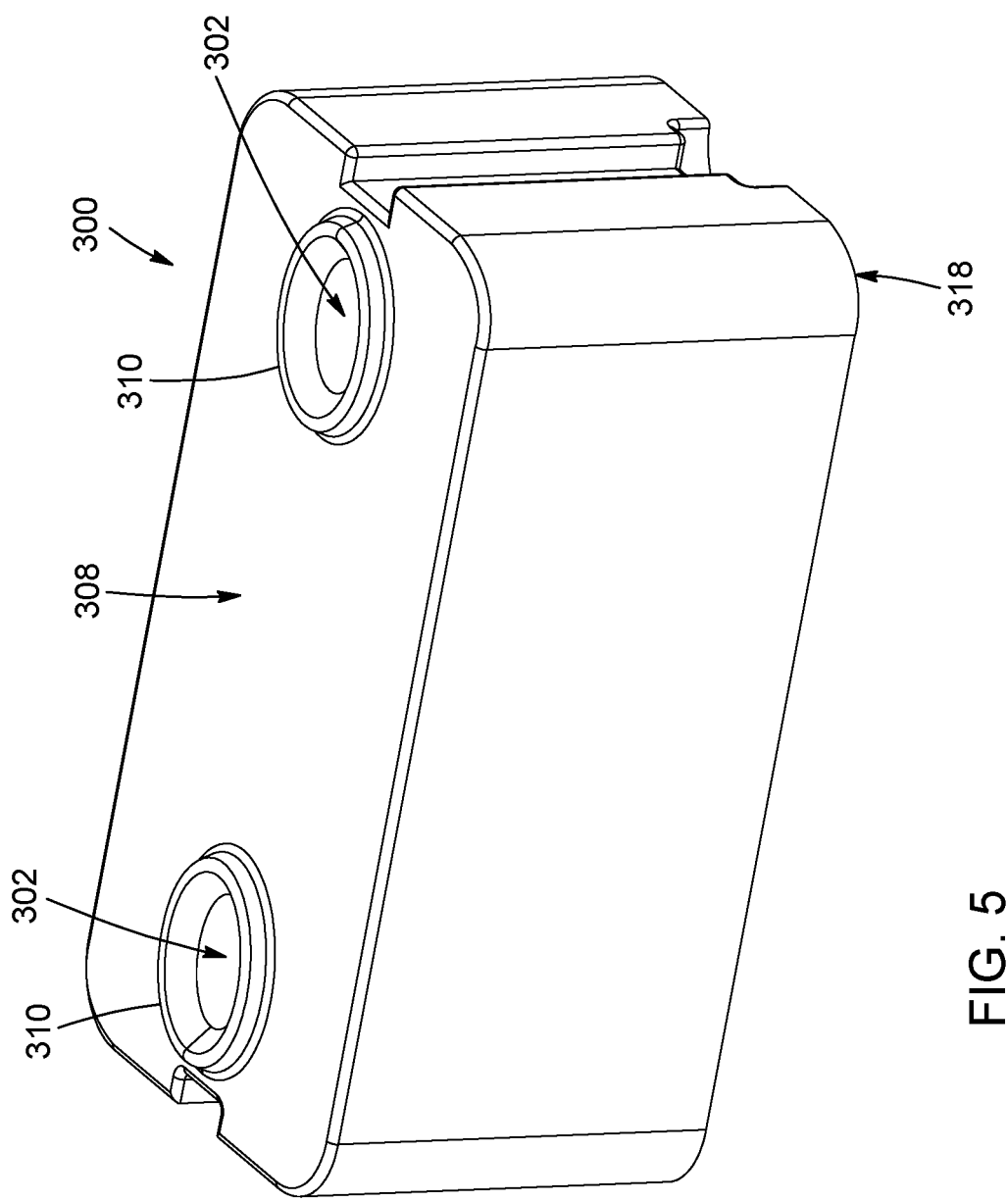
FIG. 5 is a perspective view of a cartridge of the valve of FIG. 1A, according to an embodiment.
Figure 5A:
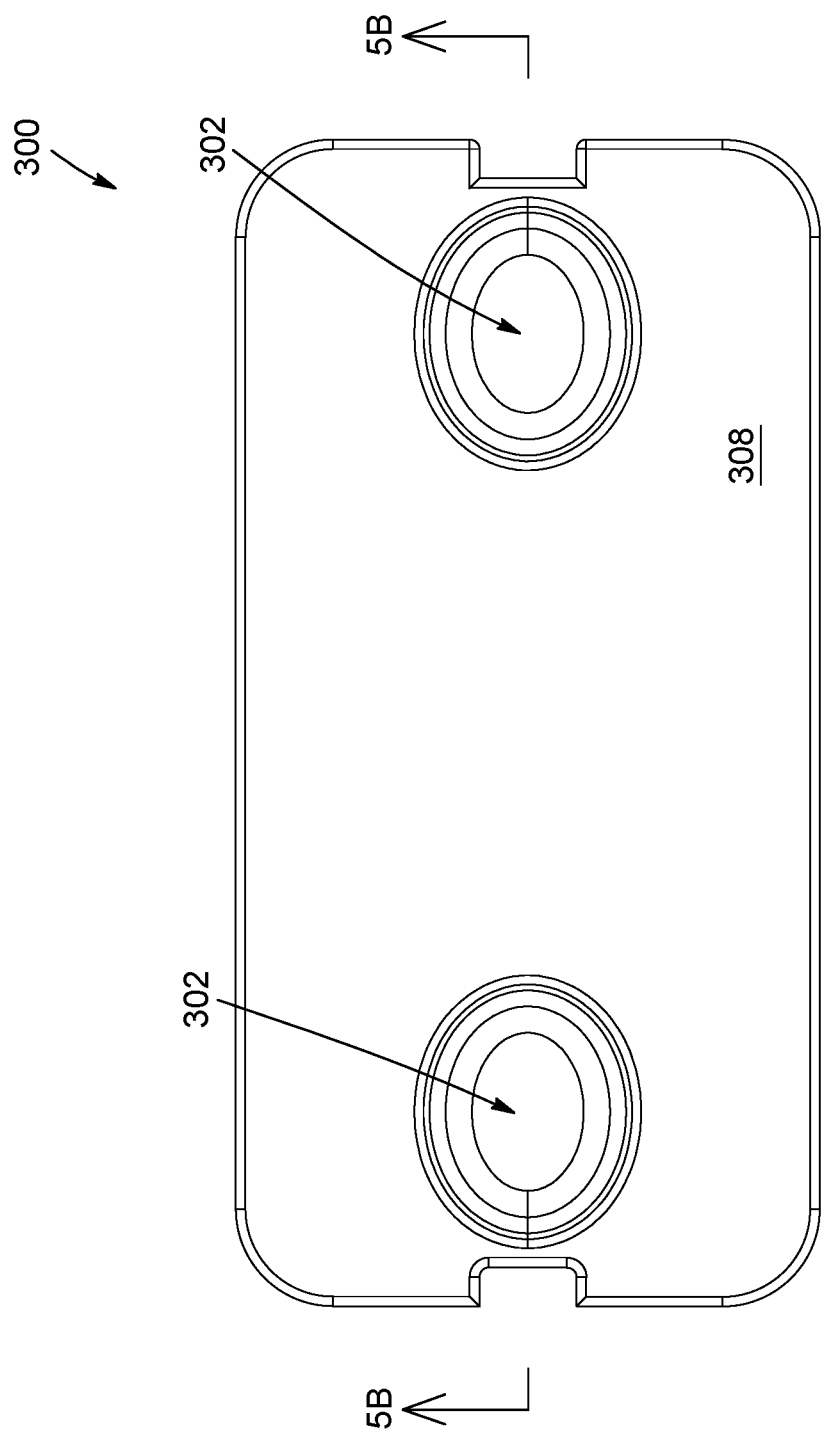
FIG. 5A is a top view of the cartridge of FIG. 5, showing a pair of ports on opposite sides of a top surface of the cartridge, according to an embodiment.
Figure 5B:
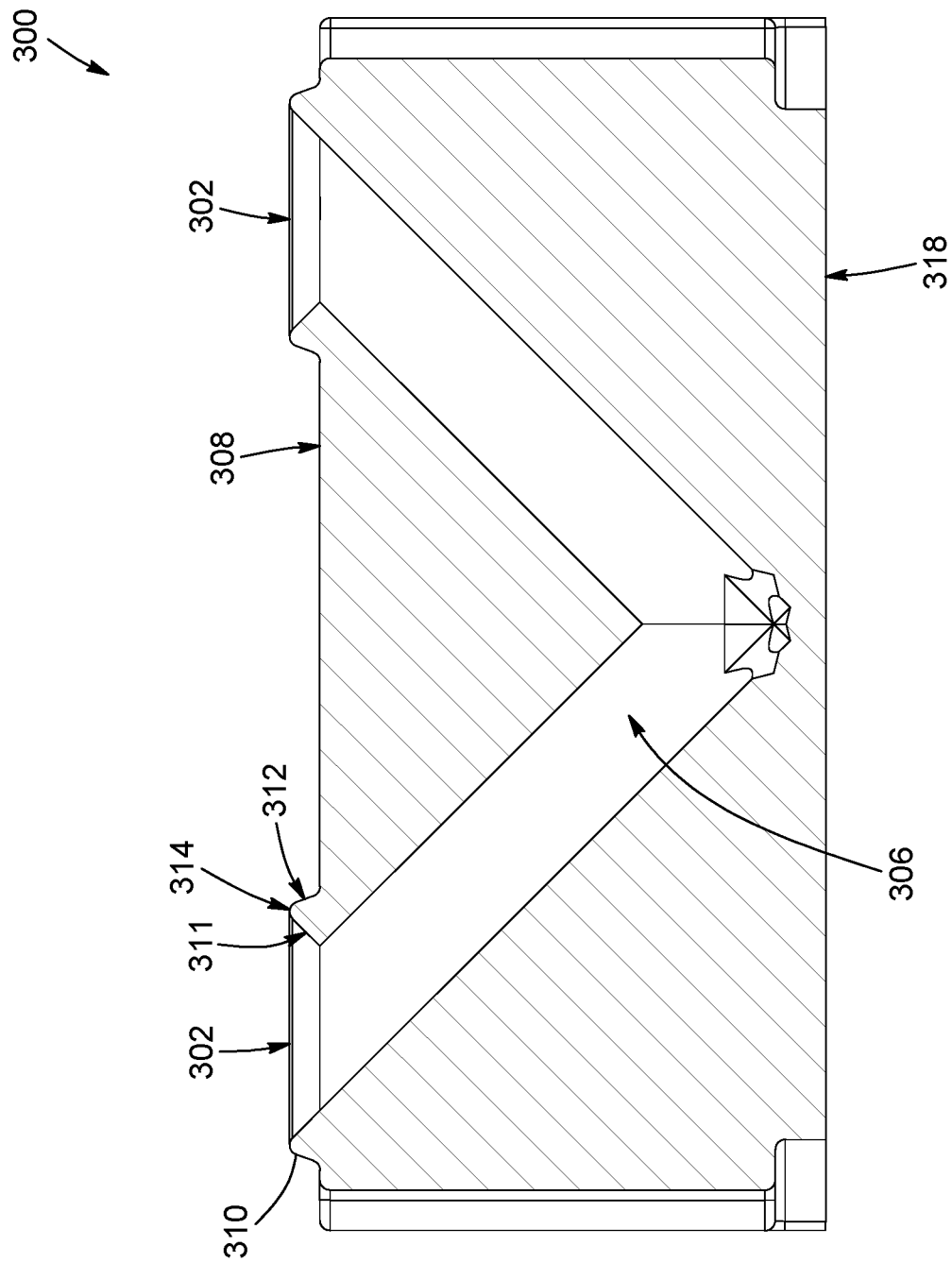
FIG. 5B is a cross-section view of the cartridge of FIG. 5A, taken along line 5B-5B, showing a channel extending within the cartridge between the pair of ports, according to an embodiment.
Figure 6:
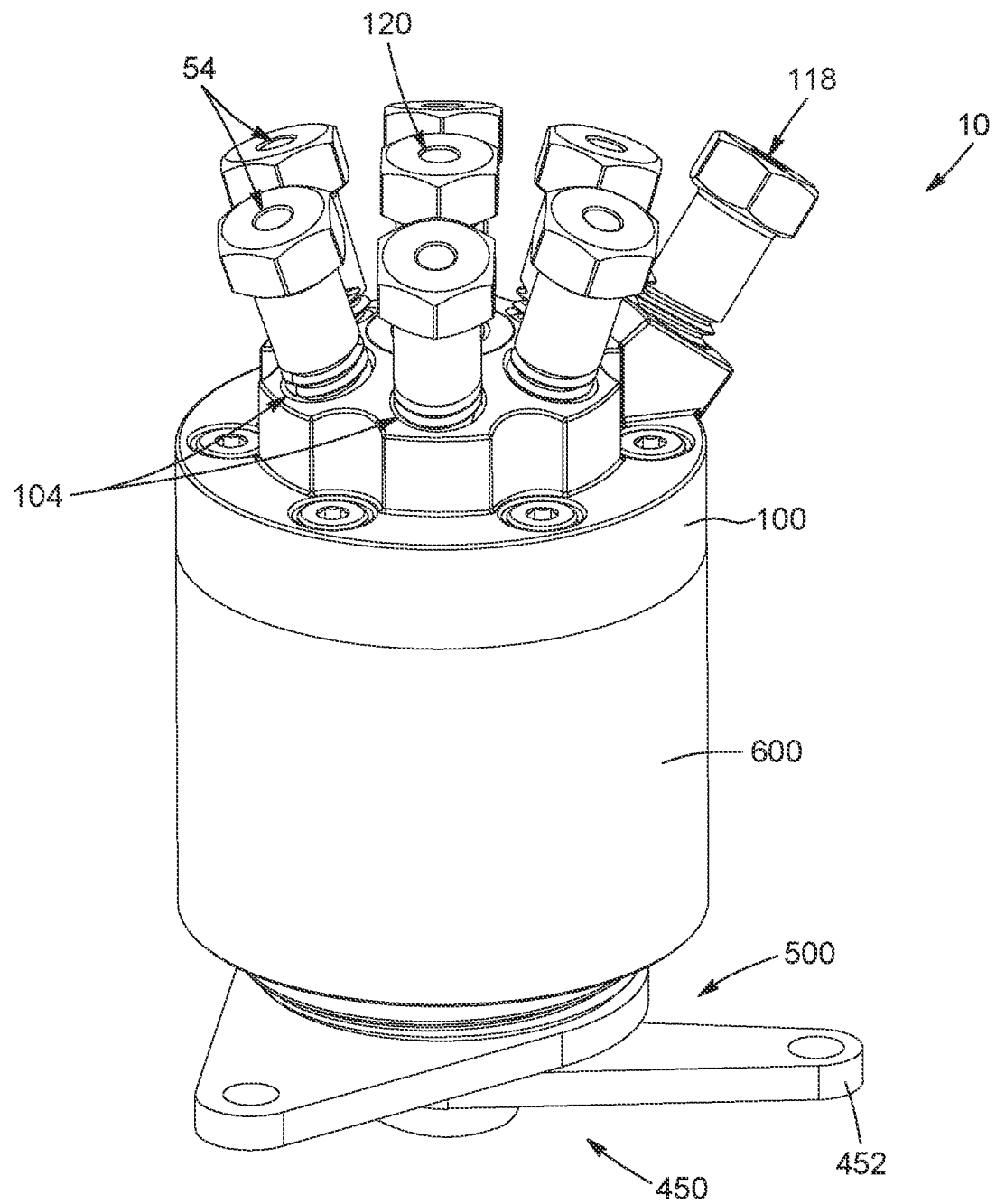
FIG. 6 is a side perspective view of a chromatography valve, according to another possible embodiment.

It should be appreciated that the movable assembly 200 is the assembly that slides or moves relative to the static body 100, between two or more positions, to control fluid circulation between the passages 104. referring back to FIGS. 1 to 5B, the valve 10 is a rectilinear slide valve, and thus the movable assembly 200 translates linearly relative to the static body 100. Furthermore, in this embodiment, the movable assembly 200 comprises several components/parts, including a movable body or plate 206, and cartridge receiving cavities 202 shaped and sized to house the cartridges 300. In the present embodiment, the cartridges 300 include one or more channels 306, each fluidly connecting a pair of cartridge ports 302 together, as seen in FIGS. 5 to 5B. Additionally, and depending on the position of the movable assembly 200 relative to the static body 100, different pairs of static ports 110 will be interconnected (or put in fluid communication with one another), via the cartridge ports 302 and corresponding channels 306. However, in other embodiments, it is possible, although less practical, to form the movable assembly 200 as a single part/component, without the cartridge receiving cavities 202, and thus without the corresponding cartridges 300. In said alternative embodiment, the channels 306 are formed directly into the movable plate 206.

Referring to FIG. 3, the second body 200 is shown in a first possible position, and in FIG. 4 in a second possible position. In the first position, a first static port 110a is fluidly connected to a second static port 110b via the channel 306 of the cartridge 300 aligned thereunder. In the second position, when the movable assembly 200 is moved toward the right side (relative to the figures), static ports 110b and 110c become fluidly connected via said channel 306. It should be noted that other channels 306 are positioned and configured to establish fluid communication between selected ones of the static ports in the first and/or second positions. In this embodiment, the movable assembly is adapted to house four cartridges 300, although it is appreciated that it can contain more. It will also be appreciated that the movable assembly can be moved in intermediate positions, such as between the first and second positions, as will be explained in more detail below.

Referring now to FIGS. 5 to 5B, in addition to FIG. 1A, a possible embodiment of a cartridge is shown. The cartridge 300 comprises a front face 308, designed and configured to face the flat face 102 of the static body 100, and a rear face 318 (or seating face). In this case, the cartridge is shaped as a rectangular prism, but of course, other shapes are possible. The cartridges 300 can be provided as blocks, machined as a single part, with the channel 306 being drilled, thus formed into a V-shape. Alternatively, the cartridges can be formed by 3D printing, and in this case the channel can take a U-shape, but also other possible shapes.

Including one or more removable/replaceable cartridges 300 in the movable assembly provides many advantages. For example, depending on the fluids to be analyzed, the material of the cartridges can be selected according to its chemical compatibility with the fluid. A more robust, and less expensive material can be chosen for the movable plate 206, such as steel or aluminum and another material can be used for the cartridges, such as ceramic, PEEK, Vespel, Teflon, or any other appropriate material. In addition, different cartridges can be provided with channels having different volumes. In small sample volume applications, the cartridge channels can be used as sample loops. In such cases, the cartridges inserted in the movable assembly can be selected based on the required volume of the cartridge channel 306. The volume of the cartridge channel can thus differ from one cartridge to another. Still another advantage provided by the use of removable cartridges is the possibility of heating them, prior to actuating the valve, so that the sample fluid circulated in the valve vaporizes when passing through the cartridge channels.

As shown in FIGS. 5 to 5B, the ports 302 are surrounded by an annular lip or ridge 310, which protrudes or extends from the cartridge's front face 308. In use, the annular lip 310 is in contact with and presses against the flat face 102 of the static body 100, and more specifically on annular regions around the static ports 110, when the valve 100 is in an operating position. In embodiments of the valve which do not include removable cartridges, and where the movable assembly is made of a single sliding plate, whereby the ports and channels are formed in the movable plate, the annular lips would also be formed directly on the sliding plate, surrounding the ports 302.

Still referring to FIGS. 5 to 5B, the annular lip 310 preferably has tapered inner and outer sides 311, 312, and an apex 314, or summit. The apex of the annular lip is in contact with the flat face 102 of the static body, and more precisely with annular regions around the static ports, when in an operating position. Optionally, the annular lip 310 can be provided with a coating, to improve sealing and/or reduce wear of the moving parts. It should be noted that, in such embodiments, the coating is preferably inert.

In fluid analysis and chromatography applications, conventional slide valves can be advantageous over diaphragm-valves, in that they do not include any flexible, deformable components (such as the diaphragm), which is subject to wear and degradation with time. In diaphragm-valves, plungers repetitively compress and retract from the diaphragm, to close or open ports, and such repeated impacts makes the diaphragm one of the most vulnerable part in the valve. In addition, the diaphragm must be made of a material which is flexible, yet resistant to impact, and also chemically compatible with the fluids being analyzed. Conventional slide valves do not suffer from these drawbacks, but due the fact that two of their main components are flat plates, compressed against one another to ensure proper sealing, they are more subject to leaks and outbound contaminants. Indeed, it is difficult to manufacture extremely flat faces on large/extended areas. Variations at the interface of the static and moving plates, although extremely small, can affect proper sealing of the communicating channels. This is especially true for applications where the gases being analyzed include small-size atoms or molecules.

The annular lips 310 provided around the ports 302 of the valve, at the interface of the sliding and static plates, greatly alleviate this drawback, since the surface area pressed again the static body of the valve is limited to these lips, rather than consisting of the entire inner surface of the sliding component. In addition, for embodiments were the cartridges are used, a biasing or resilient device can be placed underneath the cartridges, to urge or push the inserts toward the static body. In this case, any variations in the height of the cartridges and/or annular lips will be compensated or cancelled by the biasing devices. According to yet another possible embodiment, the rear face 318 of the inserts can be formed or provided with a flex point or a convex shape, so that it is properly seated in the cartridge receiving cavity.

Referring again to FIGS. 1A and 1B, a seal 116 or sealing ring is provided between the static body 100 and the movable assembly 200. The seal 116 surrounds the static ports 110 of the static body and the cartridges 300 housed in the movable assembly 200, creating a sealed space or chamber 20 between the static body 100 and movable assembly 200. Preferably, the static body 100 and/or the movable assembly 200 comprise a seal groove 114 (identified in FIG. 1B) for receiving the sealing ring 116 therein. The seal can be made of rubber or of a synthetic polymer. As best shown in FIG. 1B, the passages 104 of the static body include a purge inlet 118 and a purge outlet 120, which open in said sealed space or chamber 20. A purge fluid can thus be circulated from the purge inlet to the purge outlet, within the chamber 20, to collect and remove any impurities that may be present in the chamber 20. Optionally, the purge outlet 120 can be wider than the remaining static ports, to mitigate internal pressurization upon actuating the valve.

Referring to FIGS. 1A to 4, the valve 10 includes an actuating assembly 400, for sliding the movable assembly 200 between two or more positions. In this particular embodiment of the valve illustrated in FIGS. 1A to 4, the valve 10 is a linear slide valve, and the actuating assembly 400 comprises a carriage 402, operatively connected to the movable assembly 200. The carriage 402 can linearly slide or translate the movable assembly 200 against the static body 100. According to one particular embodiment, as illustrated, the carriage 402 may include a spring 404, compressed by a pair of cams 406 provided on each side of the movable assembly 200. The cams 406 are operatively connected to the movable assembly via the cam connectors 410, which can consist of blocks affixed to the slide plate 206, with recesses to receive ends of the cams 406. A cam linking element, or bracket, 414 connects the opposed ends of the cams 406, and can be in turn operatively connected to a linear actuator, such as a linear motor, which, when in operation, compresses or decompresses spring 404, therefore moving the movable assembly 200 back and forth, between the first and second operating positions. While in the present embodiment, the linear slide valve is movable between two positions, other embodiment of the valve can allow displacements between more than two positions, including, for example, intermediate positions, as will be explained in more detail with the description of the rotary valve.

Referring now more specifically to FIGS. 1A and 1B, means to connect and retain the static body 100 and the movable assembly 200 are provided: a pressing assembly 500 retains and presses the static body 100, in this case the plate 122, and the movable assembly 200, including slide body/plate 206 (also referred to as a "drawer") one against the other. In this example, the pressing assembly 500 includes shoulder screws 508, passed through oblong/elongated apertures in the slide plate 206, cooperating with nuts and disk springs 502, provided in nut/spring receiving cavity in the fixed plate 122. The pressing assembly 500 presses the movable assembly 200 against the static body 100 and compresses the seal 116 against the inner face of the slide plate 206. The oblong/elongated apertures in the slide plate 206 allow the slide plate to be translated linearly, providing clearance around the shoulder screws 508. In the illustrated example, the pressure applied to "seal" the fixed and slide plates is set by the shoulder screws and disk springs, and can be adjusted manually, by tightening or loosing the screws. However, in other possible embodiments, it is possible to provide the valve with pressure adjusting means, to vary the sealing force applied by the pressing assembly. Yet still, it is possible to reduce the pressure applied to the fixed and slide plates when moving the slide plate between the different operating positions and increase or reapply the pressure when the slide plate is positioned in one of the operating positions. This advantageously allows reducing the friction between the sliding and static assemblies, which in turn reduces wear and unwanted particle generation.

Referring now to FIGS. 6 to 26, possible embodiments of the chromatography valve 10 are shown, wherein the valve is a rotary slide valve 10, rather than a linear slide valve. Referring to FIGS. 6 to 9, in this embodiment, the first body 100 is a static or fixed body 100 shaped as a cover having a substantially cylindrical shape, with the passages 104 positioned in a circle, and extending in the static body 100. However, it is appreciated that other configuration of the passages 104 are possible, such as positioned along an arc instead of a complete circle for example. Each passage 104 has an outer end connectable to tubing, which can be held in place using a threaded nut 54 for example, and an inner end terminating in a static passage port 110, opening on an inner flat face 102 of the static body 100.

Figure 10:
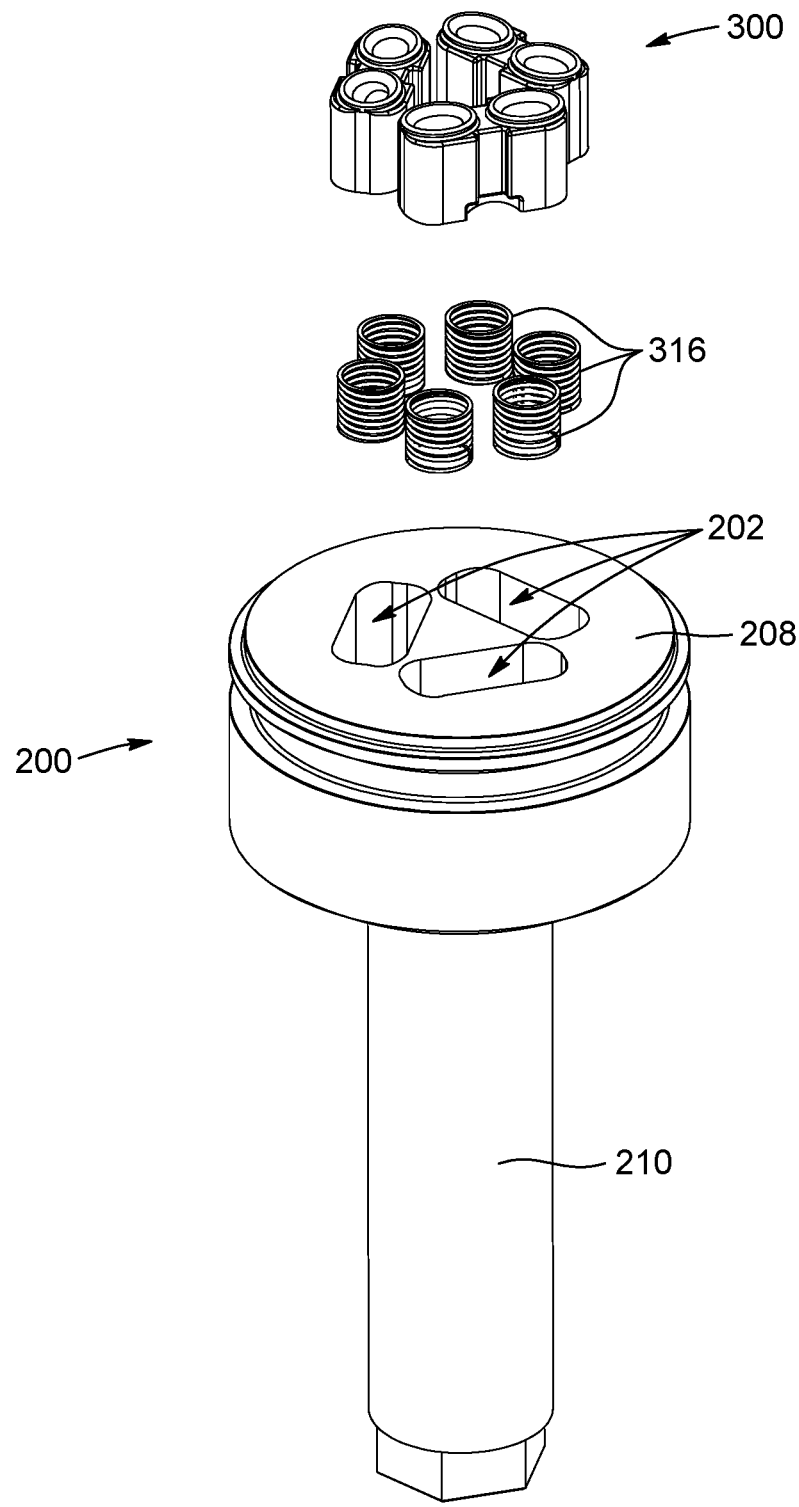
FIGS. 10 and 11 are top perspective views of a movable assembly of the valve of FIG. 6, according to different embodiments, showing a biasing device provided below the cartridges.
Figure 11:
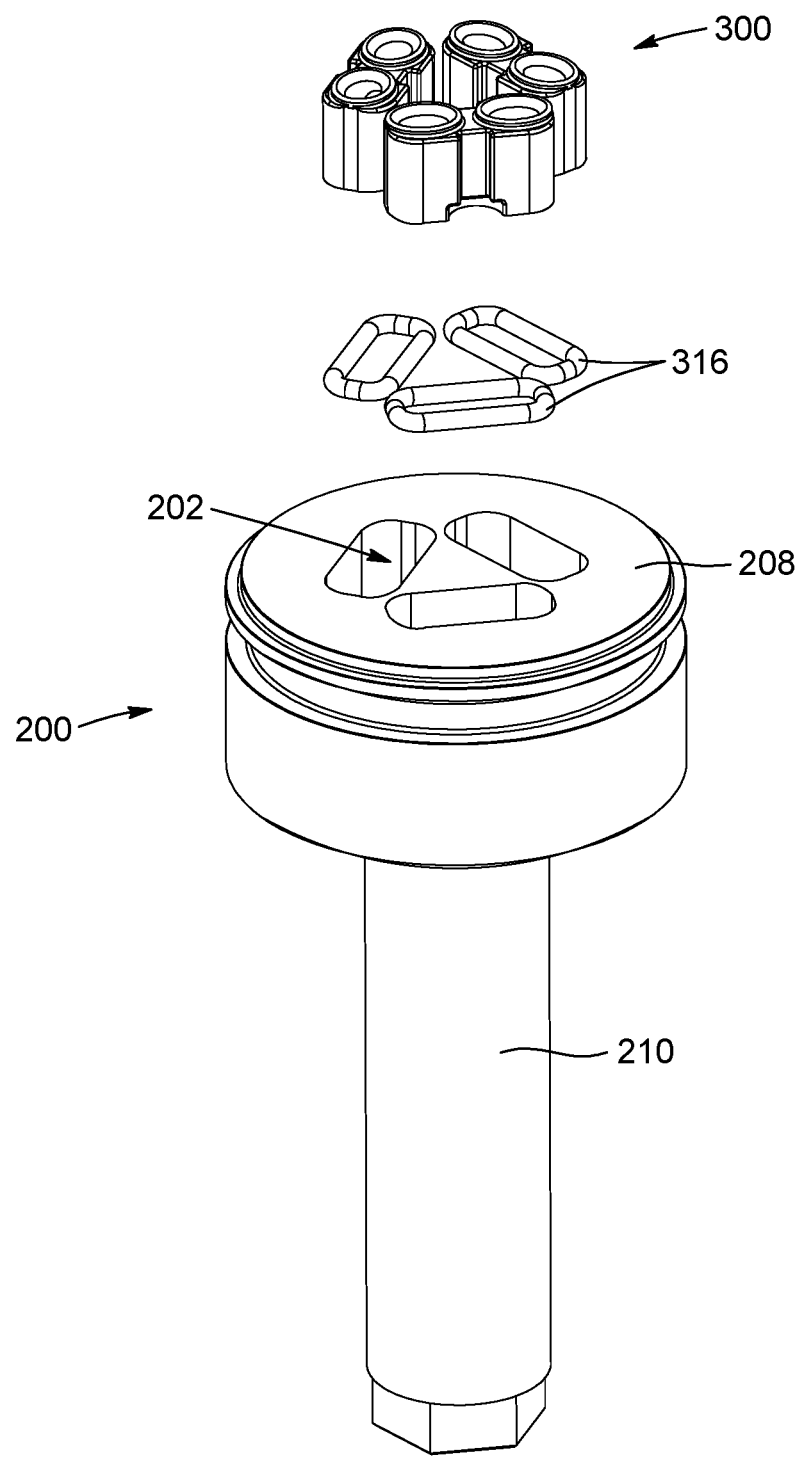

In the present embodiment, the second body is a movable assembly 200 (FIG. 7) is housed within an enclosure 600 and engages the static body 100 in a sealed relationship. The movable assembly 200 can rotate relative to the static body 100 between two or more operating positions, for controlling fluid circulation between the passages 104 extending through the static body 100. As seen in FIGS. 10 and 11, in addition to FIG. 7, the movable assembly 200 comprises a rotatable cartridge receiving body 208, such as a disk plate 208, instead of a slide plate as described above in relation to the linear valve. The rotatable disk plate 208 may optionally include the cartridge receiving cavities 202 shaped and sized to receive/house cartridges 300. In this embodiment, the disk plate 208 illustratively includes three cartridge receiving cavities 202, although it is appreciated that other configurations are possible (e.g., more cartridge receiving cavities 202).

In this embodiment, each cartridge 300 is adapted to establish fluid communication between selected ones of the passages 104 of the static body 100 when the valve 10 is in an operating position. In some embodiments, the valve can be moved between two or more operating positions, each position putting different cartridges 300 in fluid communication with different passages 104. In this example, the static body 100 includes six static ports 110 (FIG. 8), and the valve 10 includes three cartridges 300 provided in the movable assembly 200. It should be noted that, in this embodiment, the shape and size of the cartridges 300 is configured to establish fluid communication between two adjacent passages 104, although it is appreciated that other configurations are possible. For example, two or more cartridges 300 can be adapted to communicate with one another (e.g., through the disk plate 208) such that non-adjacent passages 104 can be fluidly connected.

Referring back to FIGS. 6 and 7, the movable assembly 200 comprises the disk plate 208, and a rotor arm 210 extending therefrom. The disk plate 208 and the rotor arm 210 can be made as a single component, or as two or more distinct components, cooperating together. A rotary assembly 450 includes at least one component that engages with the rotor arm 210 to rotate it. In this embodiment, the rotary assembly 450 includes a rotary lever arm 452, operatively connected to the rotor arm 210, and therefore to the disk plate 208 as well. It should thus be understood that actuating the rotary lever arm 452 effectively rotates the rotor arm 210 and disk plate 208 for moving the valve 10 in different operating positions. The rotating components of the valve can be referred to as "the rotor".

Figure 12:
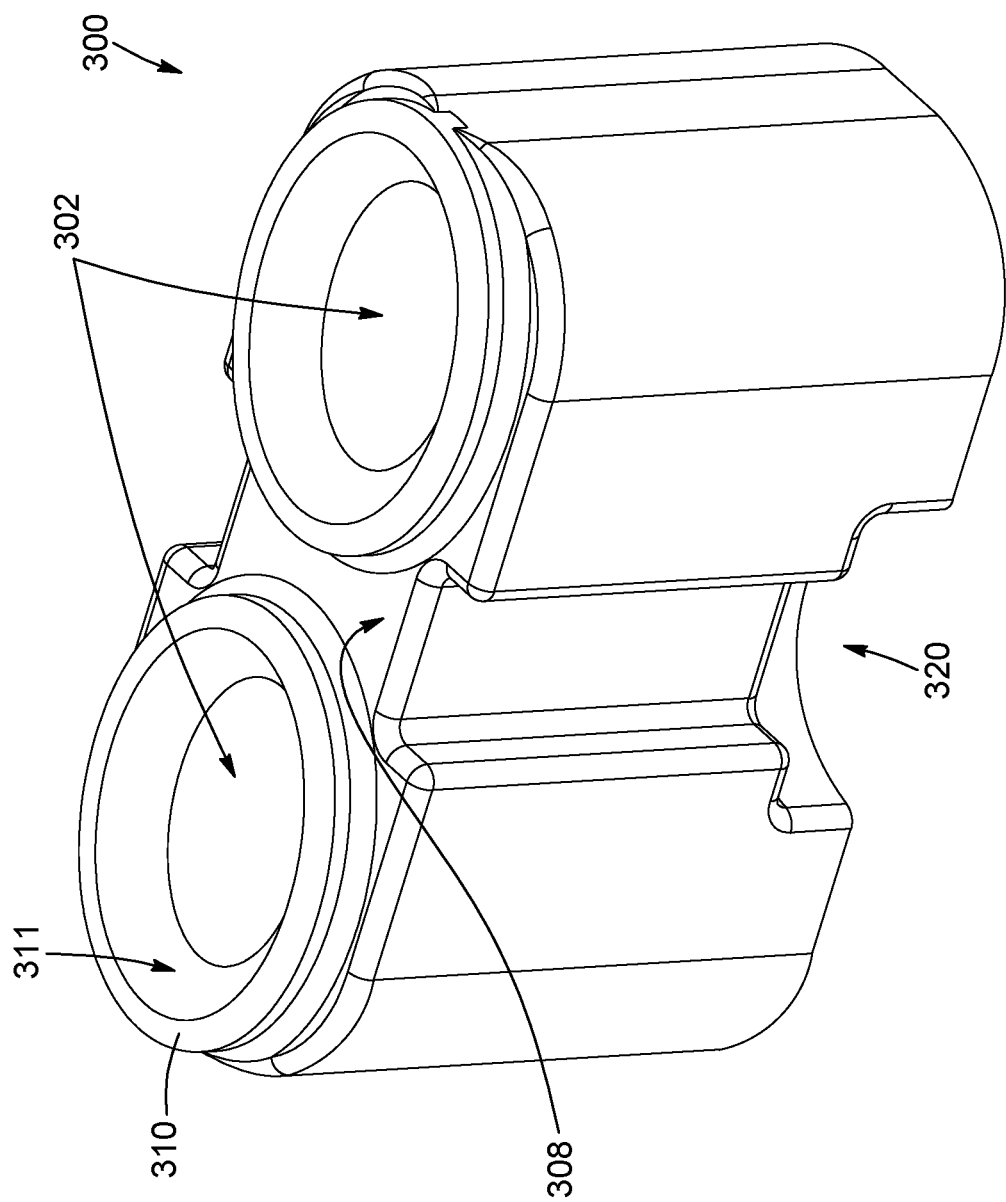
FIG. 12 is a side perspective view of a cartridge according to a possible embodiment, for use in the valve of FIG. 6.
Figure 12A:
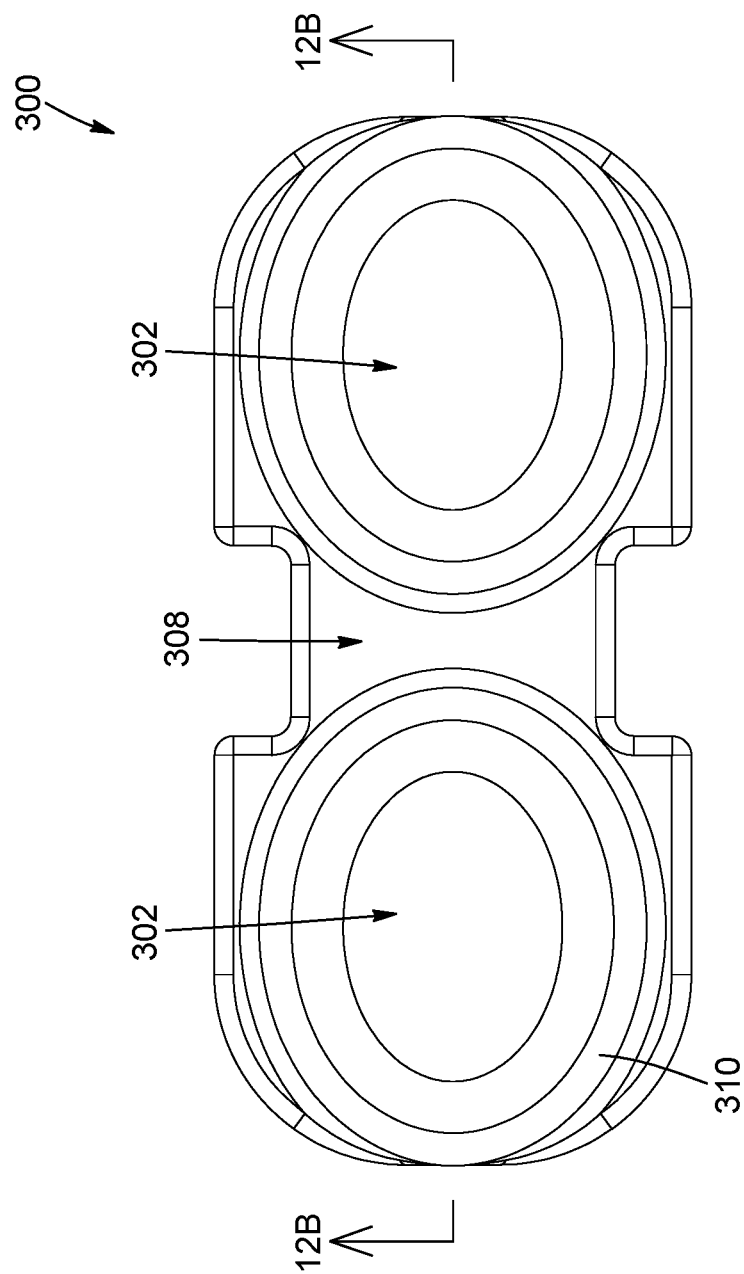
FIG. 12A is a top view of the cartridge of FIG. 12, showing cartridge ports opening on a top surface of the cartridge according to an embodiment.
Figure 12B:
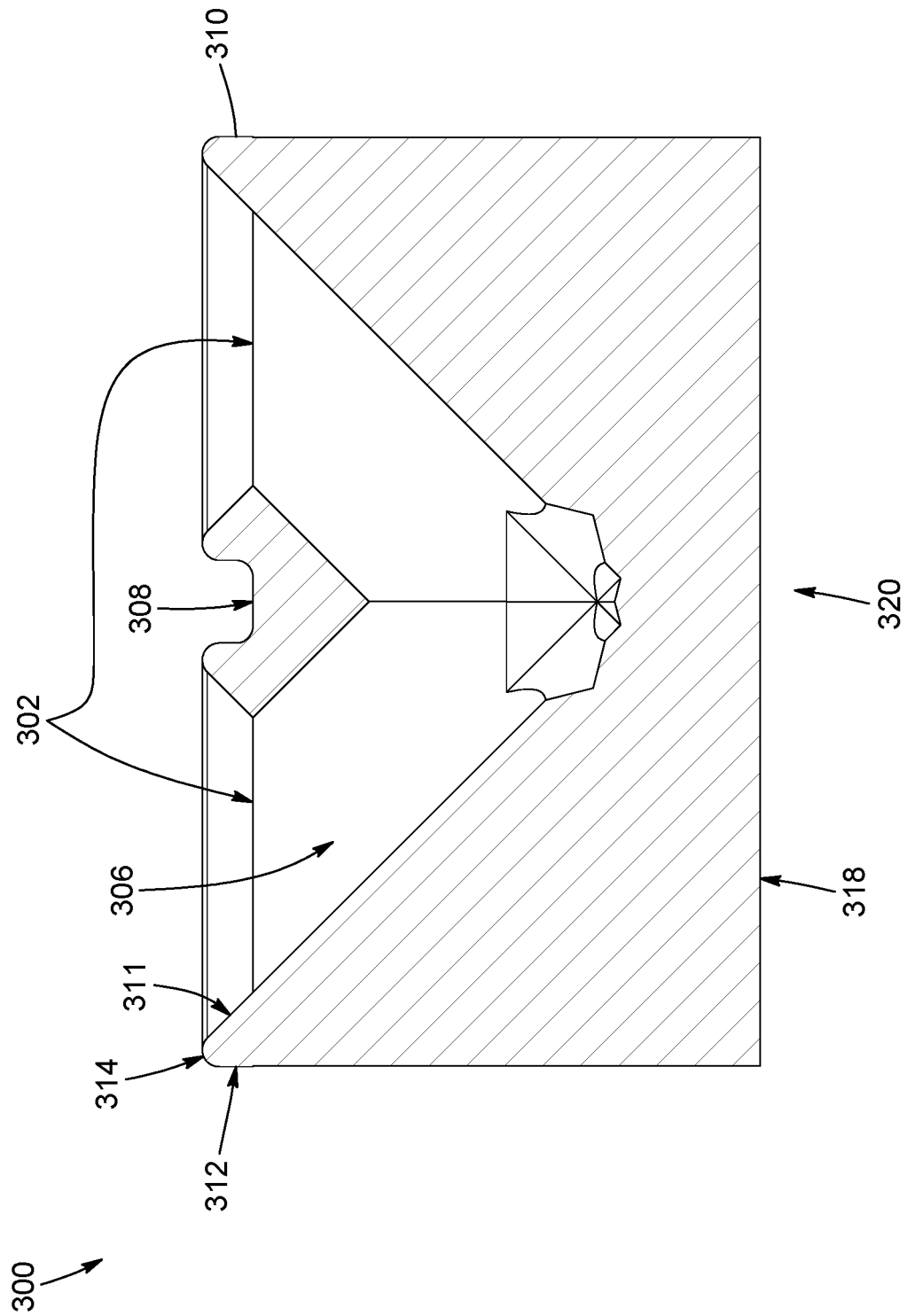
FIG. 12B is a cross-section view of the cartridge of FIG. 12A, taken along line 12B-12B, showing a channel extending within the cartridge and connecting the cartridge ports.

Referring now to FIGS. 12 to 12B, each cartridge 300 comprises a channel 306 adapted to allow fluids to flow therethrough, therefore fluidly connecting selected passages 104 of the static body 100 when the valve 10 is in an operating position. In this embodiment, the channel 306 extends within the body of the cartridge 300 and further includes a pair of cartridge ports 302 at opposite ends thereof for allowing fluid flow through the channel 306. More specifically, the cartridge 300 includes a front/outer face 308 facing the flat face of the static body, when in use. The cartridge ports 302 illustratively open on the front face 308 for facing the static ports of the static body.

When in an operating position, the cartridge ports 302 face two of the static ports 110, depending on the position of the valve 10 (i.e., depending on the position of the movable assembly 200), in order to channel fluid through selected ones of the passages 104, via the channel 306. In the present embodiment, the cartridges 300 are made of metal and the channels can therefore be machined within the body of the cartridge. As such, it is appreciated that the channels 306 can have a cross-sectional V-shape, as seen in FIG. 12B. However, in other embodiments, the cartridges can be 3D printed, from metal or other material, and thus the channel can take a different shape, such as a U-shape or other possible shapes. Yet still, it would be possible to form the cartridges by linking two independent valve seats, interconnected by a thinner linking element.

Still referring to FIGS. 12 to 12B, each cartridge port 302 can be surrounded by an annular ridge, or lip 310 protruding from the front face 308, the annular lip 310 being, when in use, in contact and pressed against the flat face 102 of the static body 100. In some embodiments, the annular lips 310 surrounding the ports 302 can have tapered inner and/or outer sides 311, 312 joining at an apex 314, the apex being in sealing contact with annular regions surrounding the static ports 110 of the static body (e.g., when positioned in one of the operation positions). A coating can also be provided on the protruding annular lips 310, to reduce friction and wear of the area of the annular lips in contact with the fixed body 100 (e.g., the apex 314). Each cartridge 300 also includes a rear face/seating face 318, opposite the front face 308. The rear face 318 of the cartridges may be provided with a flex point 320, for properly seating the cartridges 300 in respective cartridge receiving cavities. As can be appreciated, the cartridges 300 can be interchangeable and/or selected depending on the material compatibility or volume required. For example, the channels 306 can be shaped and sized to hold a volume of fluid between about 1.0 µl and 5.0 µl, although it is appreciated that other volumes are possible.

Referring back to FIGS. 10 and 11, to ensure that the annular lips 310 are correctly pressed against the flat face 102 of the static body 100, one or more biasing devices 316, such as springs (FIG. 10), resilient elements/pads (FIG. 11) or the likes, can be provided underneath the cartridges 300, to push the cartridges 300 toward the static body 100. In some embodiments, each cartridge receiving cavity 202 can be respectively provided with a biasing device 316 such that each cartridge 300 is independently pushed upwardly toward the static body 100. However, it is appreciated that other configurations are possible. For example, and with reference to FIGS. 13A and 13B, the disk plate 208 can be removably connected within a disk plate receiving cavity 209 of the movable assembly 200. It is noted that in the illustrated embodiment, the biasing device 316 includes a single polymeric/resilient pad provided within the disk plate receiving cavity 209, below the disk plate 208. As such, the resilient pad 316 is effectively positioned below the cartridges 300 when positioned within the cartridge receiving cavities 202 defined in the disk plate 208.

Figure 13A:
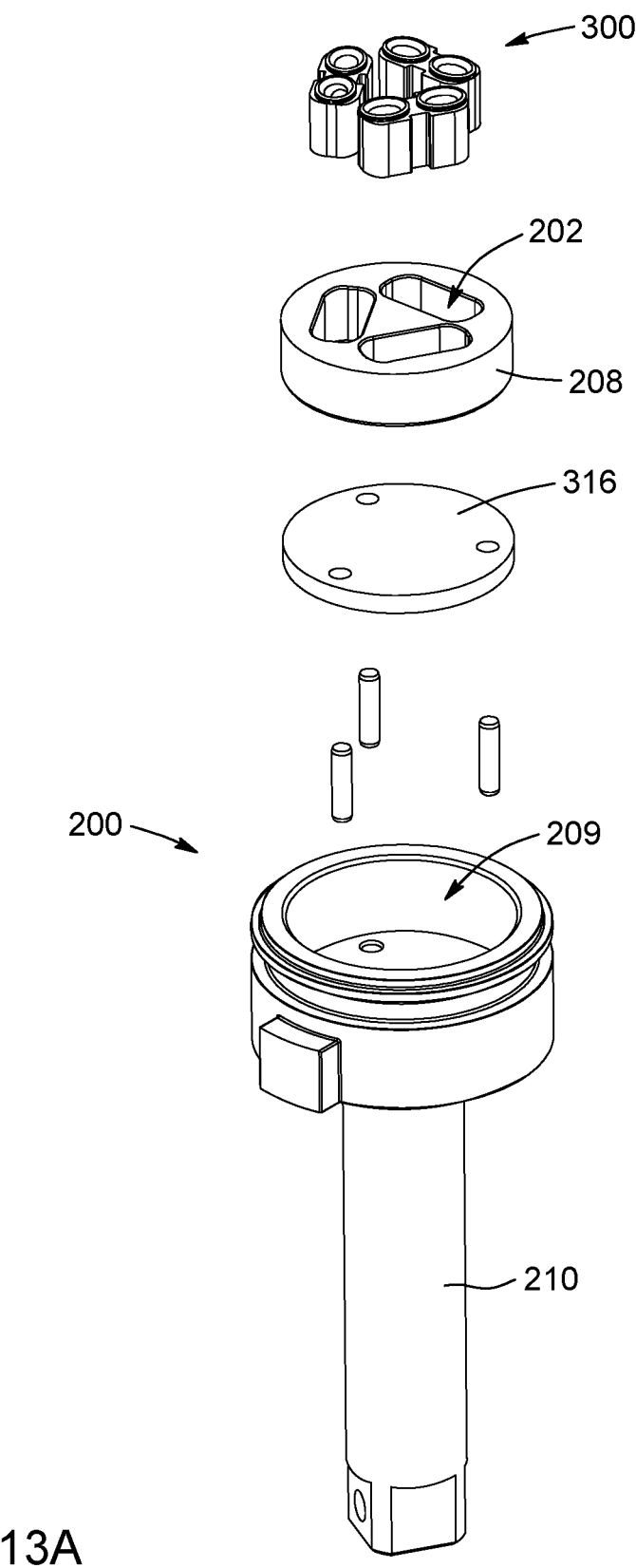
FIGS. 13A and 13B are top perspective views of possible embodiments of the movable assembly, showing a removable disk plate with a single biasing device provided below said disk plate.
Figure 13B:
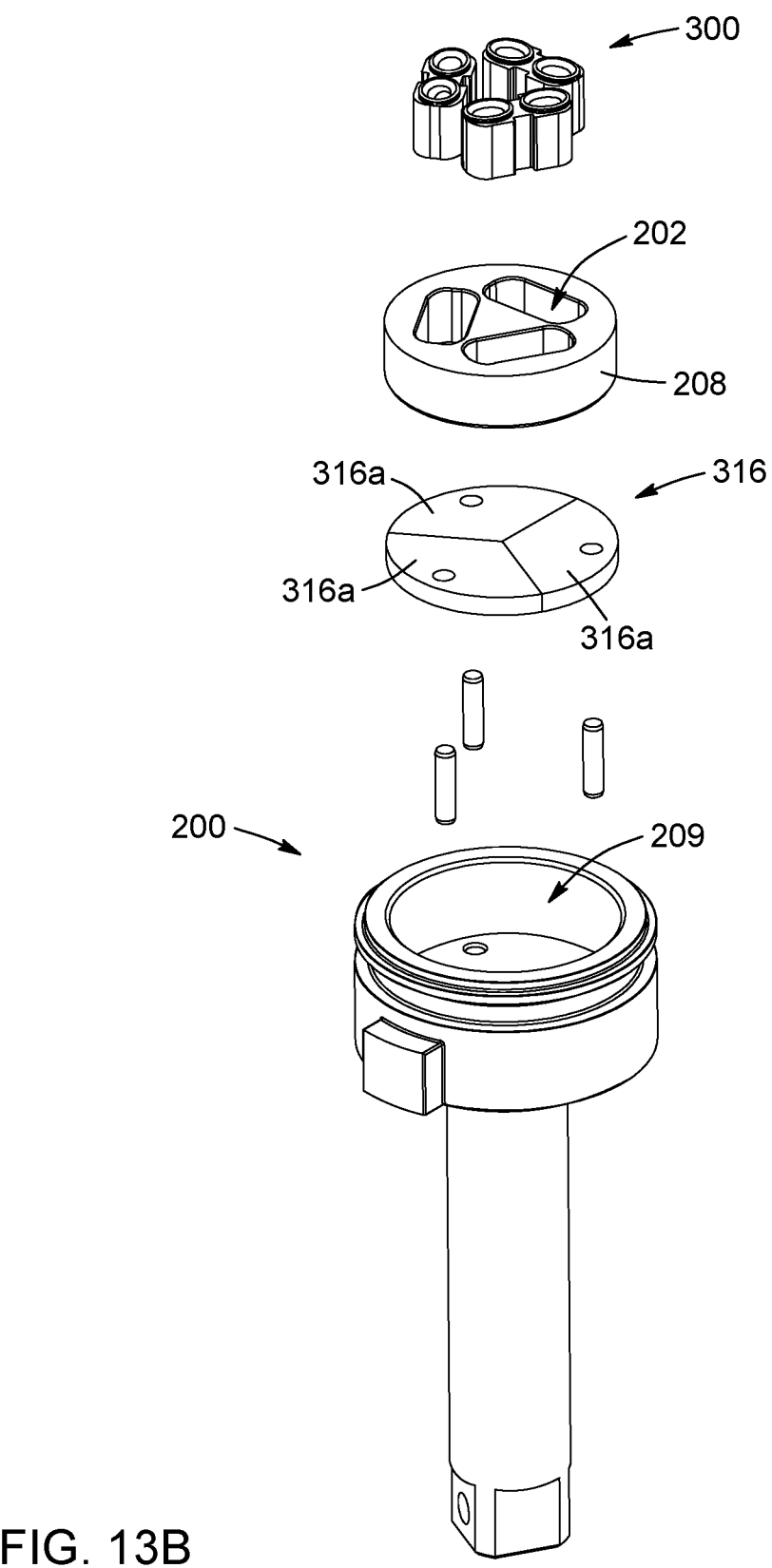

In the exemplary embodiment shown in FIG. 13B, the resilient pad 316 includes a plurality of resilient portions 316a configured to push one or more of the cartridges 300 toward the static body 100. More specifically, the resilient portions 316a can have different resiliencies for pushing the cartridges 300 upwardly independently from one another, and with a selected force. In some embodiments, the resilient portions 316a include different materials and/or thickness or materials to allow different resiliencies between the portions, although it is appreciated that other configurations are possible.

Figure 14:
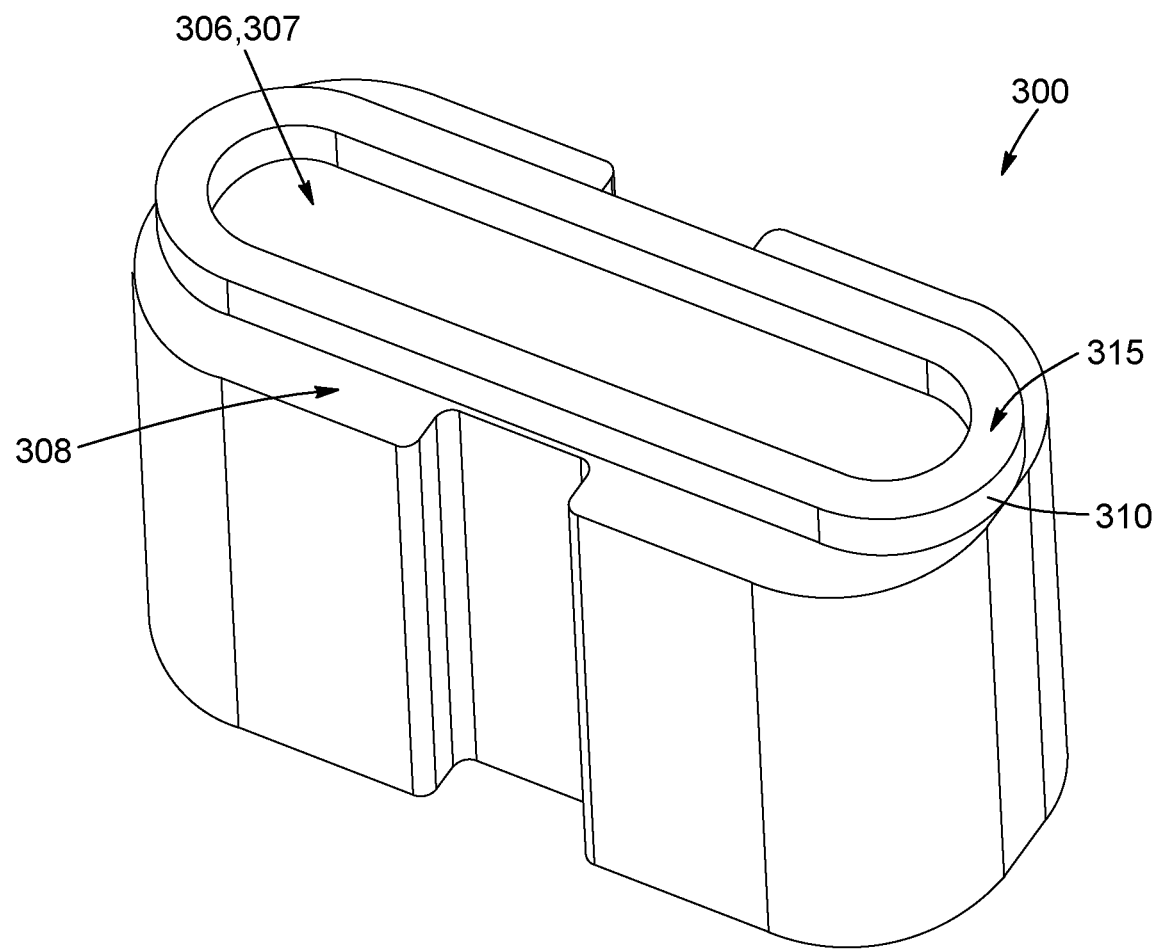
FIG. 14 is a perspective view of a cartridge according to another embodiment, with the channel provided on the top surface of the cartridge.
Figure 15:
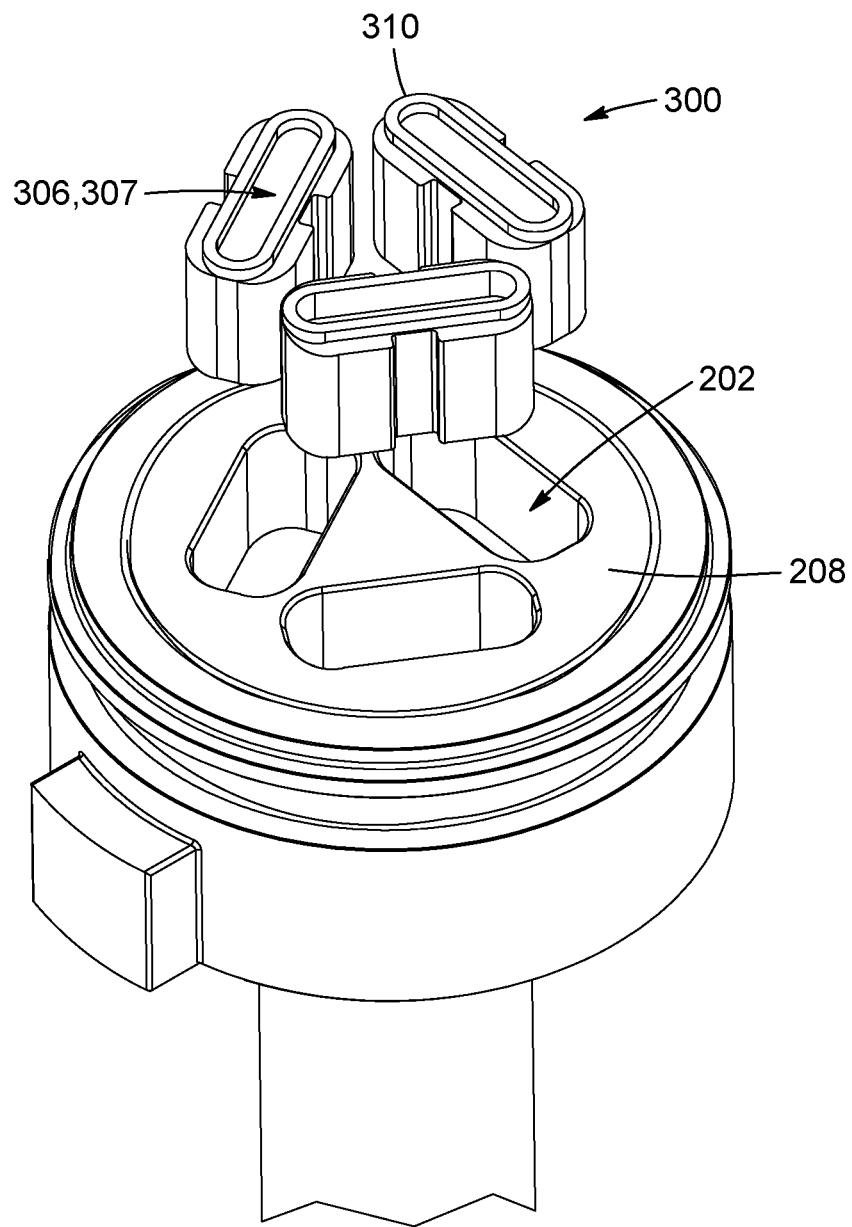
FIG. 15 is a top perspective view of a movable assembly, according to an embodiment, showing cartridges of FIG. 14 insertable in the disk plate.

Now referring to FIGS. 14 and 15, an alternate embodiment of the cartridge 300 is illustrated. In this embodiment, the channel 306 includes or is shaped as a recess 307, without including a pair of cartridge ports. The channel 306 is defined on the front face 308 of the cartridge 300. In this embodiment, the annular lip 310 protrudes about the recess 307, surrounding a periphery thereof. As described above, the annular lip 310 is adapted to contact the flat face 102 of the static body 100 around static ports 110, when the valve 10 is in an operating position. In this embodiment, the annular lip 310 includes a substantially flat top surface 315 for contacting the flat face 102 and creating a seal to prevent fluid from escaping the recess 307. However, it is appreciated that other configurations are possible, such as having an annular lip 310 provided with the apex 314, as described above. The recess 307 is shaped and sized such that the annular lip 310 surrounds two of the static ports 110 when in contact with the static body 100, thereby allowing fluid communication therebetween via the channel 306 (i.e., via the recess 307). Similar to previous embodiments, the recess 307 can be configured to hold a pre-selected volume of fluid, such as between about 1.0 µl and 5.0 µl, depending on the required volume, although it is appreciated that other volumes are possible. As seen in FIG. 15, it is appreciated that cartridges 300 having recesses 307 of different volumes can be used in the same disk plate 208.

Figure 16:
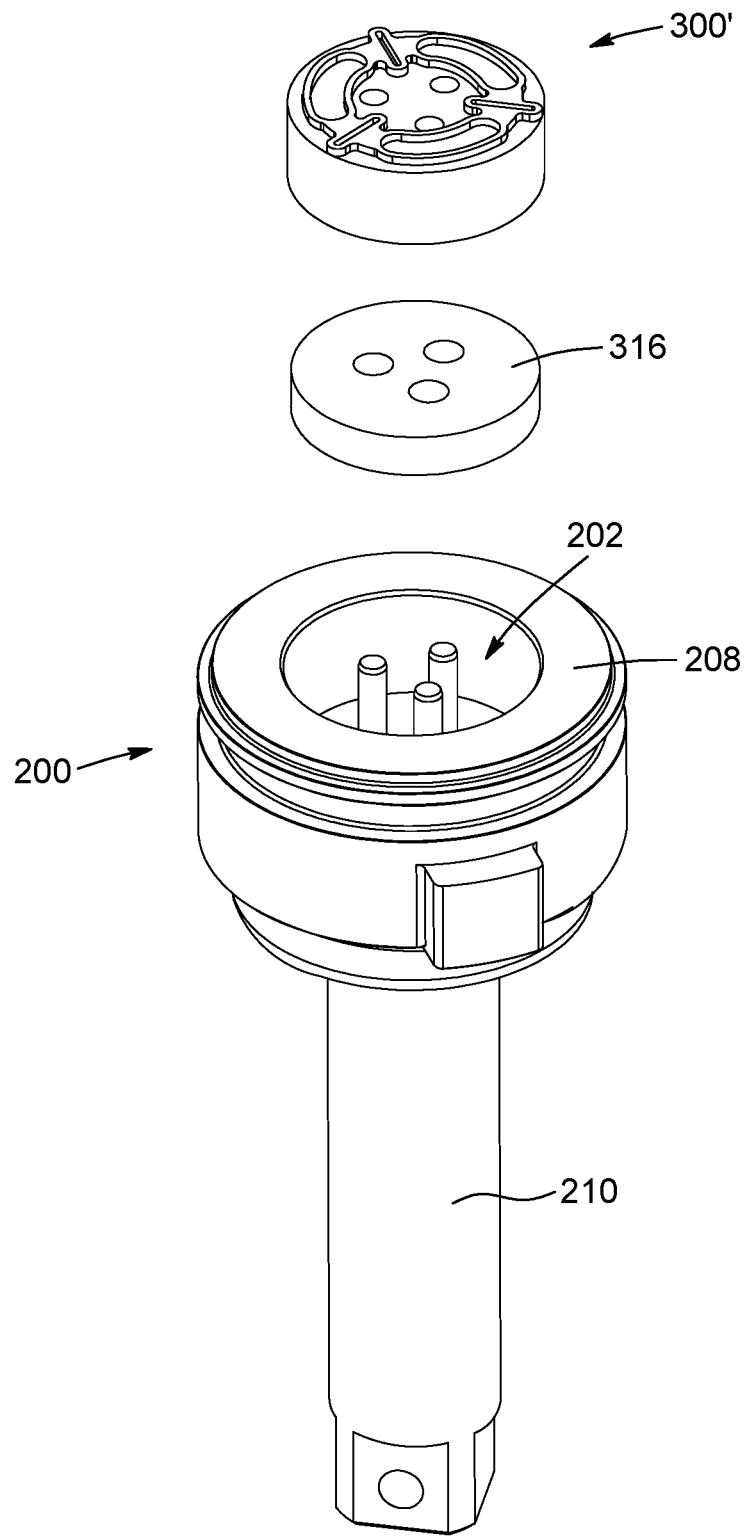
FIG. 16 is a top perspective and partially exploded view of another possible embodiment of the movable assembly, showing a single cartridge provided over the biasing device.
Figure 17:
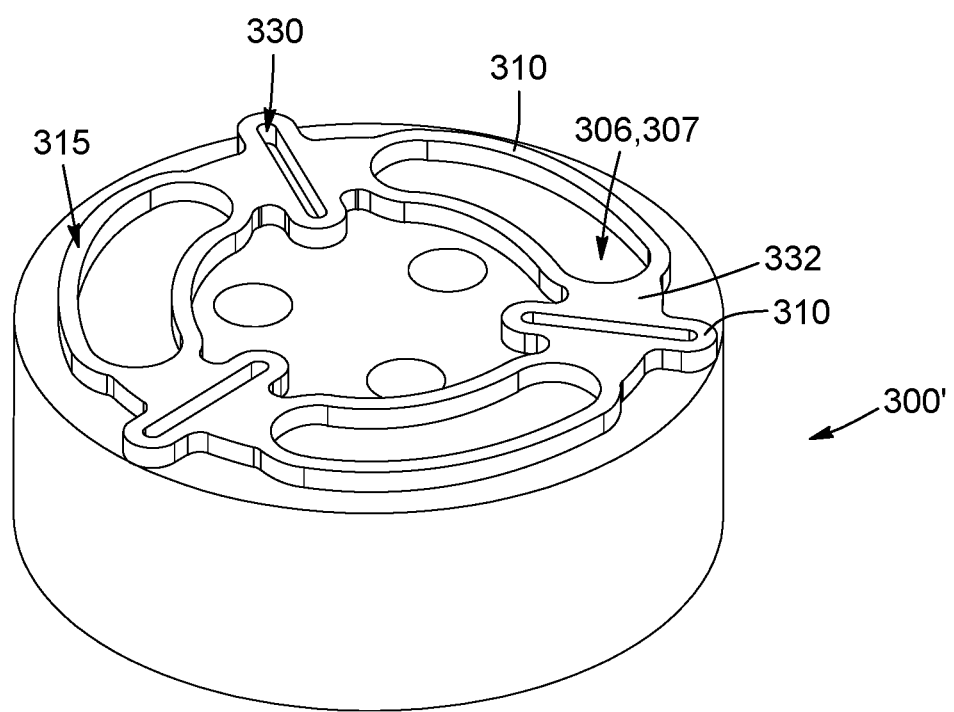
FIG. 17 is a perspective view of the single removable cartridge shown in FIG. 16, showing channels defined on a top face thereof, according to an embodiment.
Figure 18:
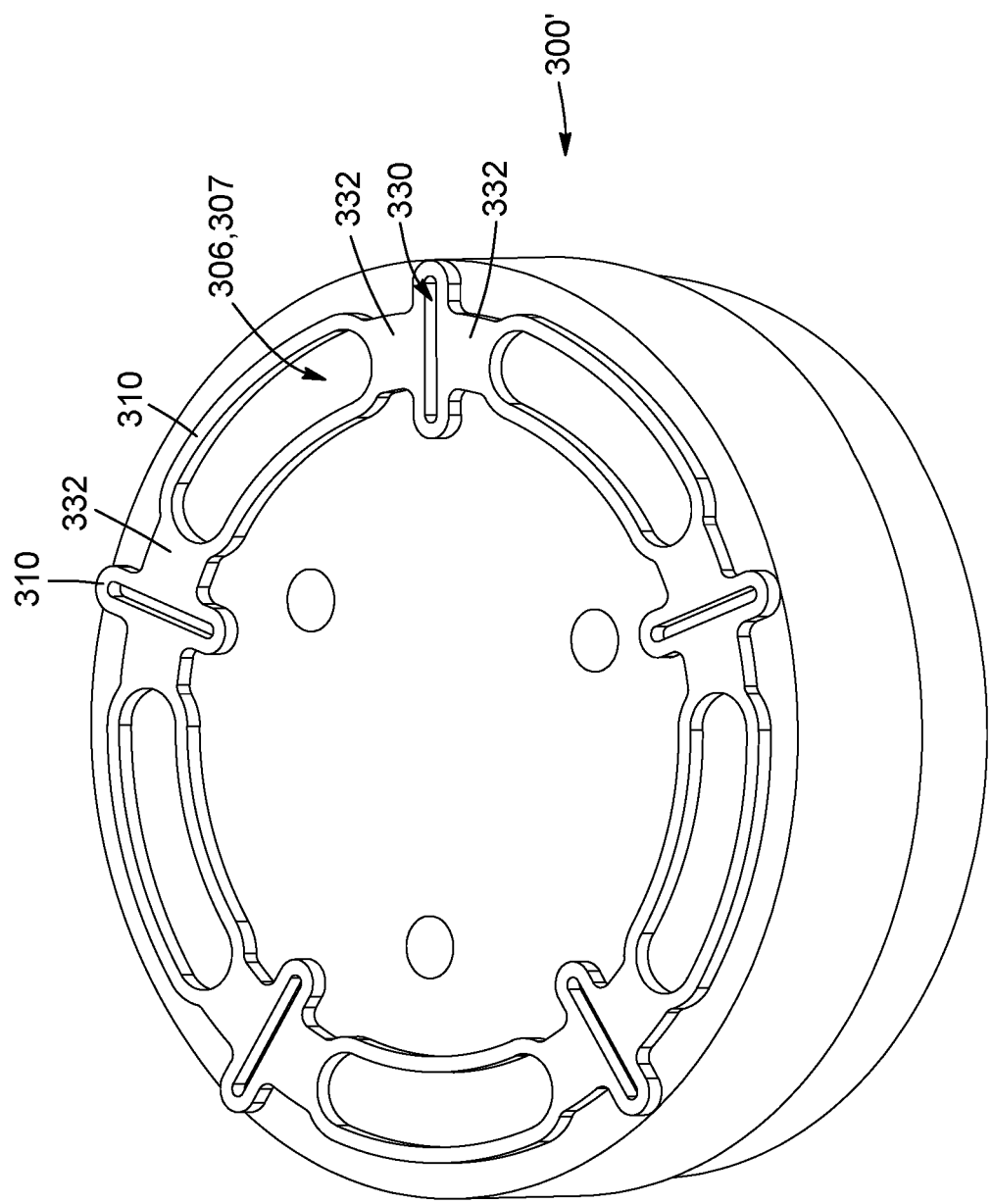
FIG. 18 is a perspective view of another embodiment of the single cartridge for use in the movable assembly of FIG. 16.

Now referring to FIGS. 16 to 18, the movable assembly 200 can include a single cartridge receiving cavity 202 adapted to receive a single cartridge 300'. In this embodiment, the single cartridge 300' includes a plurality of channels 306 adapted to establish fluid communication between selected ones of the passages 104. The illustrated channels 306 respectively include recesses 307 defined on the front face 308 of the cartridge 300'. In this embodiment, each recess 307 extends along a portion of the periphery of the cartridge 300' to allow the fluid communication between a given recess 307 and two adjacent static ports/passages of the static body 100. Although not illustrated, it should be understood that the channels 306 of the single cartridge 300' can include the cartridge ports 302 instead of the recesses 307. Additionally, the single cartridge 300' can include any suitable number of channels/recesses 306, 307. For example, the single cartridge 300' of FIG. 17 has three recesses 307, and is thereby adapted to cooperate with a static body having six static ports. Alternatively, the single cartridge 300' of FIG. 18 has five recesses 307, and is thereby adapted to cooperate with a static body having ten static ports.

It should be appreciated that having a plurality of recesses 307 defined in the single cartridge 300' can facilitate manufacturing substantially even annular lips 310 (e.g., lips having the same height). More particularly, each recess 307 can be machined substantially simultaneously to define leveled top surfaces 315 across each recess 307, thereby increasing the seal created by pressing the annular lips 310 against the flat face 102 of the static body 100.

Figure 19A:
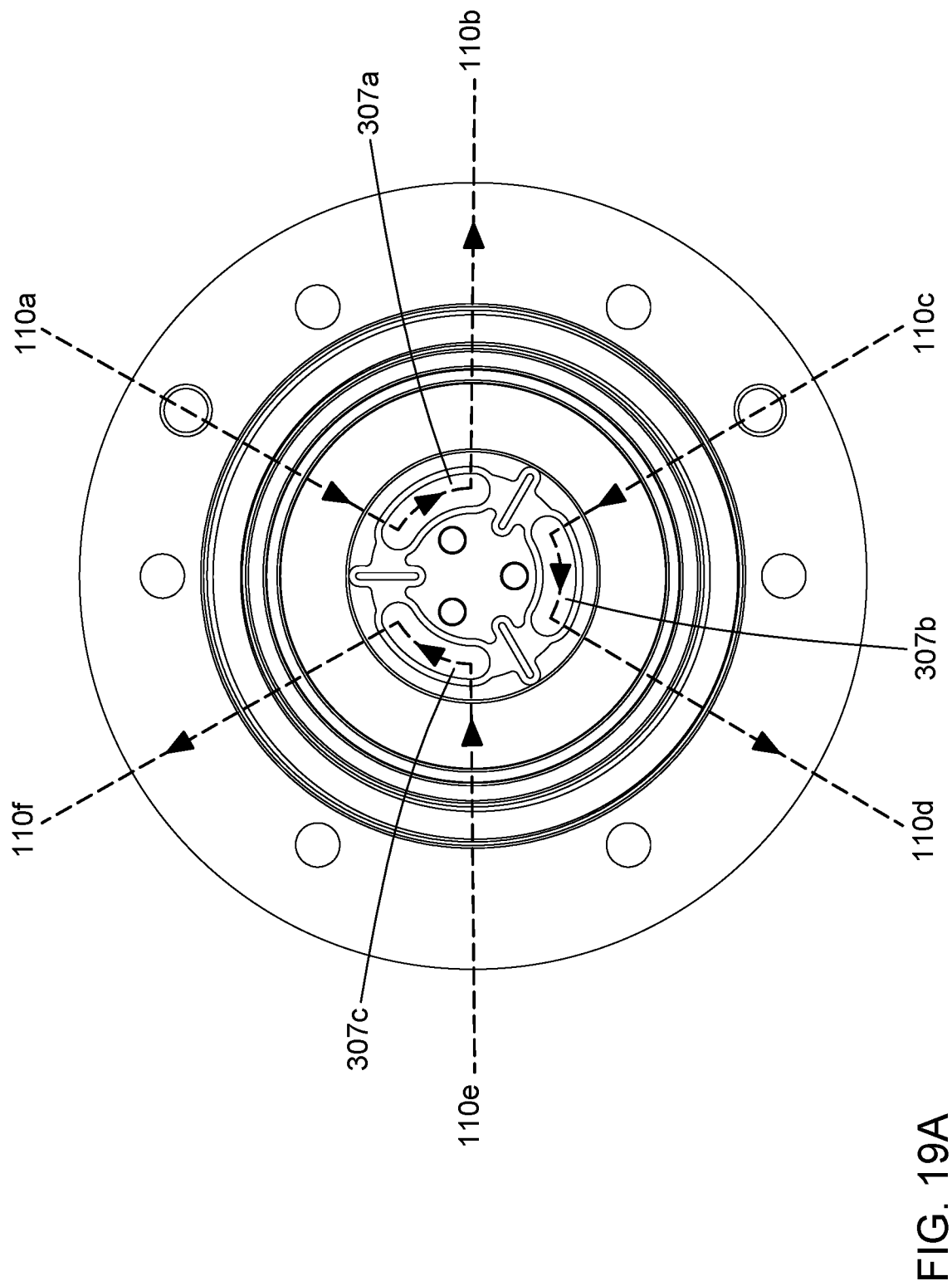
FIG. 19A is a top view of the movable assembly of FIG. 16, showing the movable assembly disposed in an enclosure and positioned in a first position.
Figure 19B:
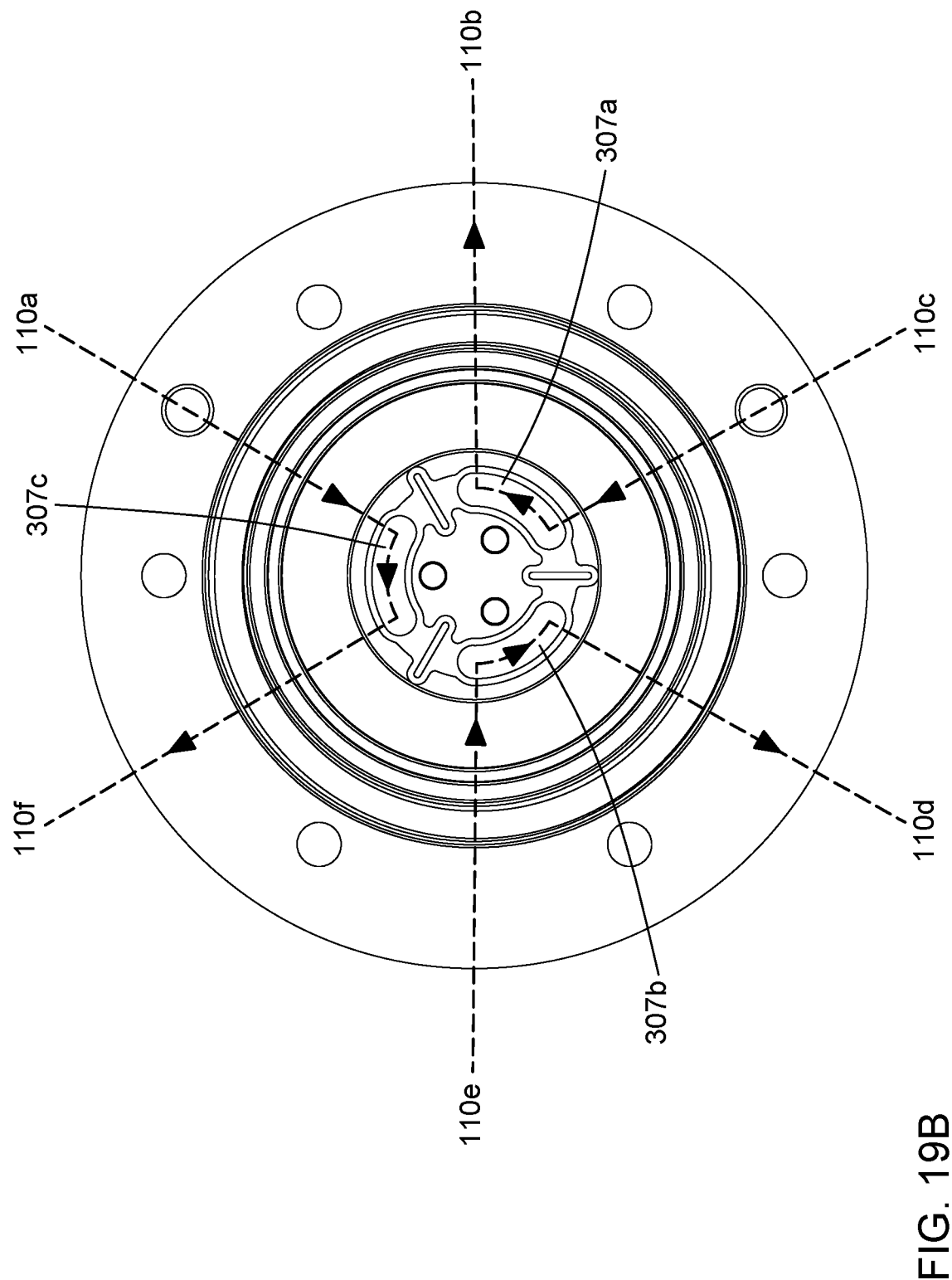
FIG. 19B is a top view of the movable assembly of FIG. 19A positioned in a second position.

Similar to the previous embodiments, and as seen in FIGS. 19A and 19B—actuating the valve 10 having the single cartridge 300' effectively moves the movable assembly 200 between various operating positions for establishing fluid communication between selected ones of the static ports 110a-110f (schematically illustrated) of the static body 100. For example, in a first operating position, seen in FIG. 19A, static port 110a is connected to static port 110b via a first recess 307a, static port 110c is connected to static port 110d via a second recess 307b, and static port 110e is connected to static port 110f via a third recess 307c. Once the movable assembly is rotated and the valve is in a second operating position, as seen in FIG. 19B, the first recess 307a now connects static ports 110b and 110c, the second recess 307b connects static ports 110d and 110e, and the third recess 307c connects static ports 110a and 110f. It should be understood that the illustrated embodiment is exemplary and that other configurations of the valve 10 using the single cartridge 300' are possible.

In some embodiments, the rotary valve does not include cartridges, i.e. the channels 306 (e.g., the ports 302 and/or recesses 307) are formed directly in the disk plate 208, and the annular lips 310 surround said channels 306 and are thus also formed directly on the disk plate.

Referring back to FIG. 7, the valve includes a sealing ring 116, which surrounds the static ports 110 and the cartridges 300 opening at the interface of the static body 100 and disk plate 208, thereby creating a sealed space 20 therebetween. The sealed space 20 is very small, since the static body 100 and disk plate 208 are pressed against one another, but still, a given volume of air is present between the two surfaces and is sufficient to be contaminated by outbound or inbound contaminants and impurities. By sealing this space or volume, a purging fluid can be circulated to collect and remove any impurities that may be present in this space. In the present embodiment, the fixed enclosure 600 comprises a seal groove 114, in which the sealing ring 116 (e.g., a rubber and/or polymeric O-ring) is nested. Although less practical, it would be possible to provide the groove in the fixed body 100, or in the disk plate 208. In addition, the passages 104 provided in the static body 100 include a purge inlet 118 and a purge outlet 120, for purging impurities from the sealed space 20, by creating a purge flow using the purging fluid.

Figure 20:
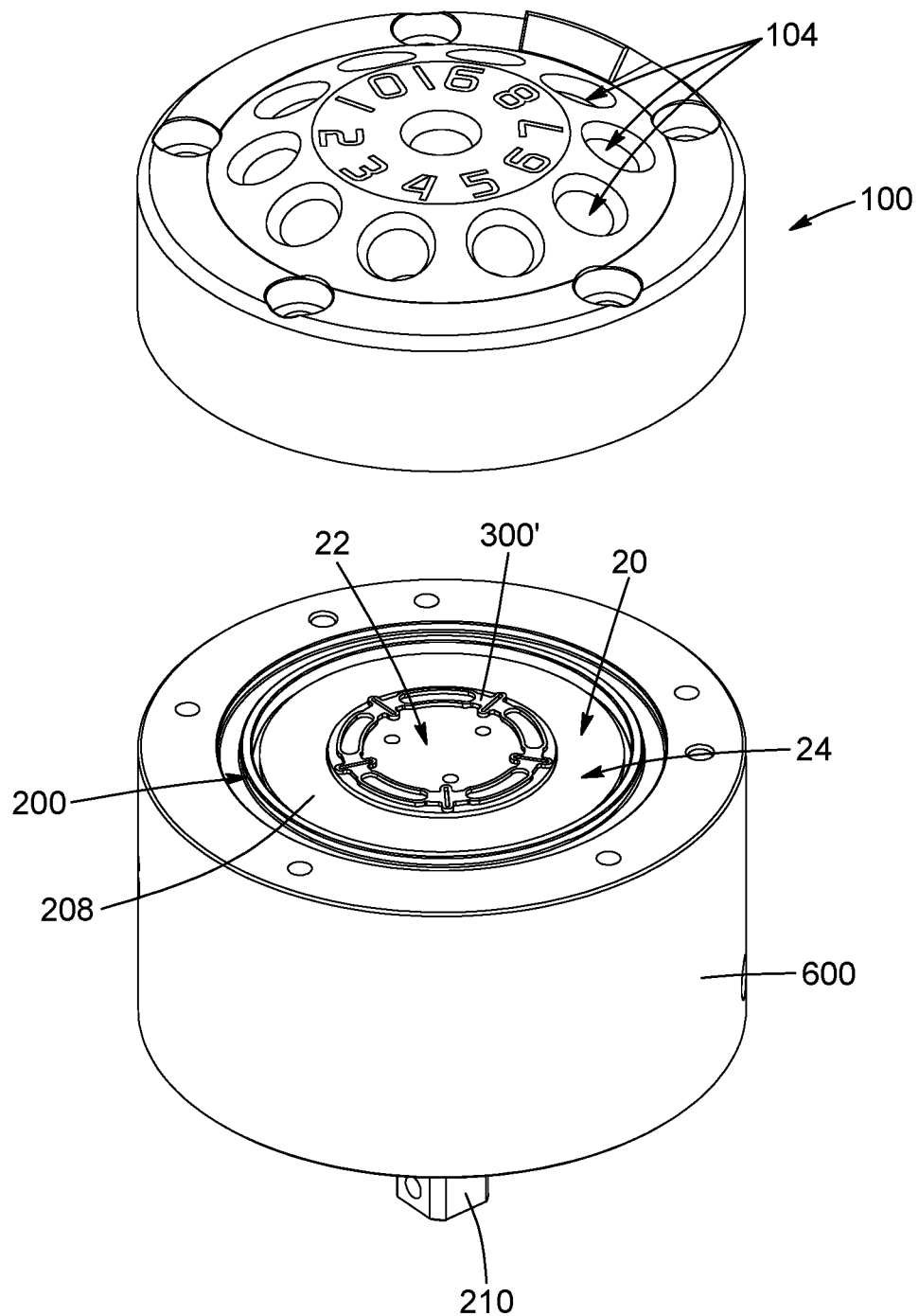
FIG. 20 is a top perspective and exploded view of a rotary valve according to an embodiment, showing a sealed space defined between the movable assembly and static body.
Figure 21:
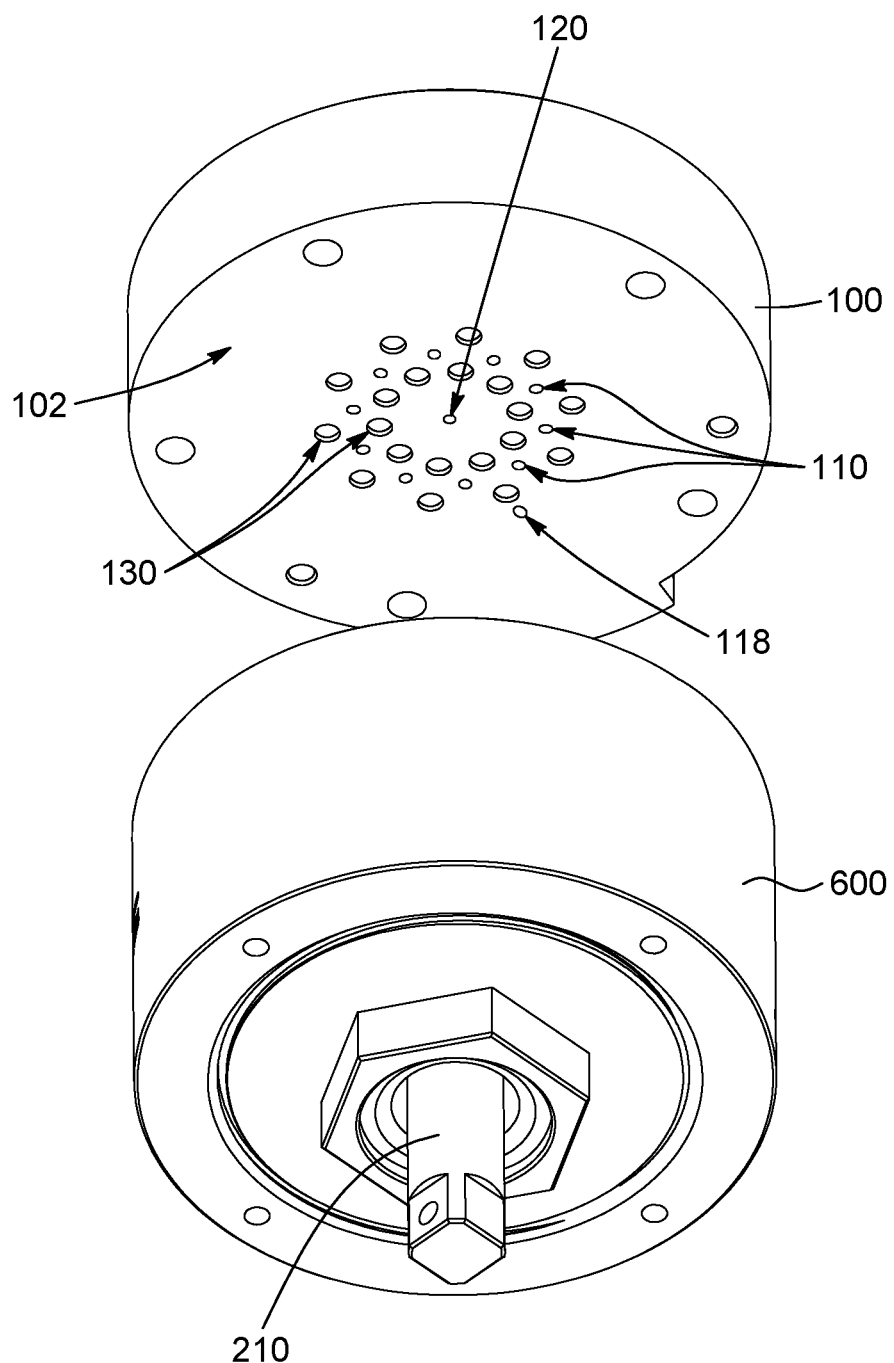
FIG. 21 is a bottom perspective and exploded view of the rotary valve of FIG. 20, showing purge pockets defined in the flat surface of the static body, according to an embodiment.

In addition, and as seen in FIGS. 17 and 18, the single cartridge 300' can include purge channels 330 radially extending between adjacent channels 306 (e.g., recesses 307). In the present embodiment, additional annular lips 310 can surround the purge channels 330 and further connect with the annular lips 310 surrounding adjacent recesses 307 via lip connectors 332. As described above, purging fluid is circulated within the sealed space 20 for eliminating impurities. As seen in FIGS. 20 and 21, the sealed space 20 defined between the static body 100 and the movable assembly 200 can include an inner section 22 and an outer section 24 respectively located on (or above) the single cartridge 300' (i.e., the section surrounded by the annular lips 310 and lip connectors 332) and around the single cartridge 300'. The purge channels 330 are thus adapted to allow fluid communication between the inner and outer sections 22, 24 of the sealed space 20 such that purging fluid is allowed to flow from the purge inlet to the purge outlet when the disk plate 208 (and cartridge 300') is pressed against the static body 100.

Still referring to FIGS. 20 and 21, due to the presence of the annular lips 310 about the entire periphery of the single cartridge 300', fluid communication between the inner section 22 and outer section 24 can be prevented when the disk plate 208 is pressed against the static body 100. To ensure fluid communication between the sections of the sealed space 20, the static body 100 can be provided with purge pockets 130 adapted to facilitate fluid communication through the purge channels 330. More specifically, the purge pockets 130 are depressions defined in the flat face 102 of the static body which are adapted to be positioned above a corresponding end of one of the purge channels 330.

More specifically, the purge pockets 130 are shaped and configured to allow fluid communication between a corresponding end of a purge channel 330 and one of the inner and outer sections 22, 24. Therefore, a purge flow is defined along each purge channel 330 from the outer section 24 (where the purge inlet 118 is located) towards the inner section 22 (where the purge outlet 120 is located). It will thus be understood that any fluid which escapes a given recess 307 cannot cross into an adjacent recess 307 as the purge flow of the corresponding purge channel 330 will drag any particles towards the purge outlet. As seen in FIG. 21, the number of purge pockets 130 can exceed the number of operating positions of the valve 10 such that purging fluid is allowed to flow substantially continuously (e.g., even when in the intermediate position(s)).

Figure 7:
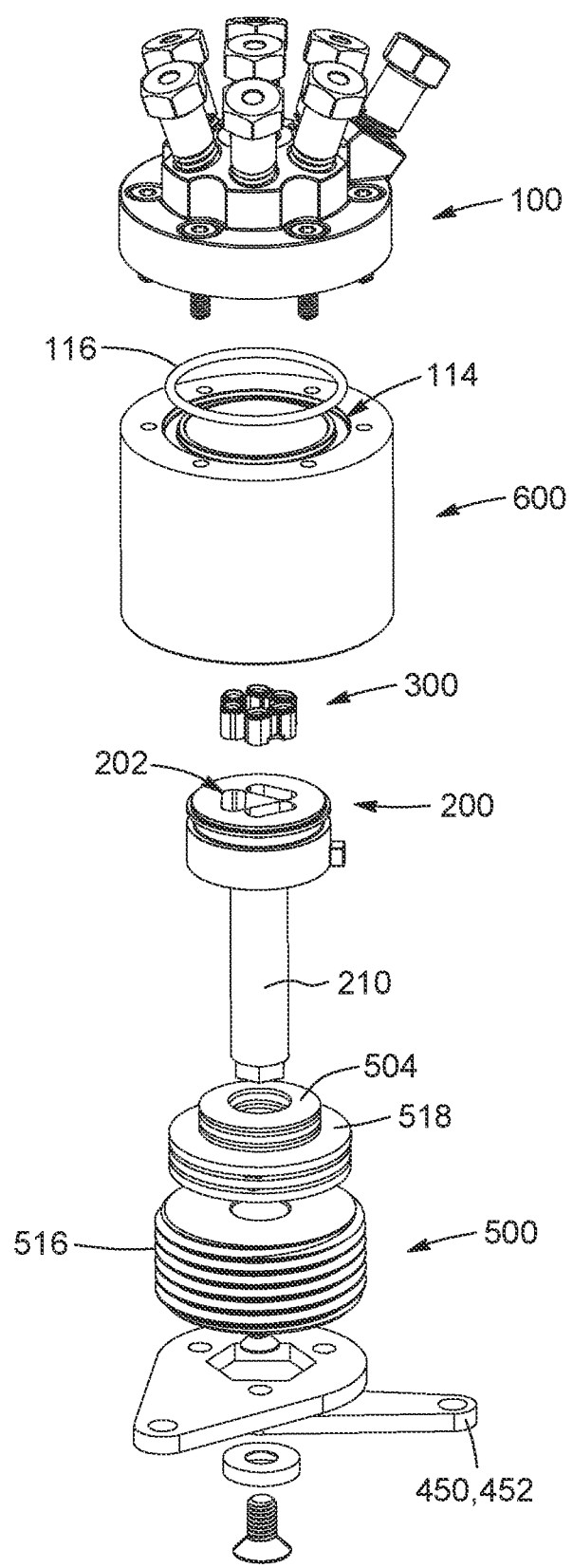
FIG. 7 is a perspective and exploded view of the chromatography valve of FIG. 6, showing the different components of the valve.
Figure 8:
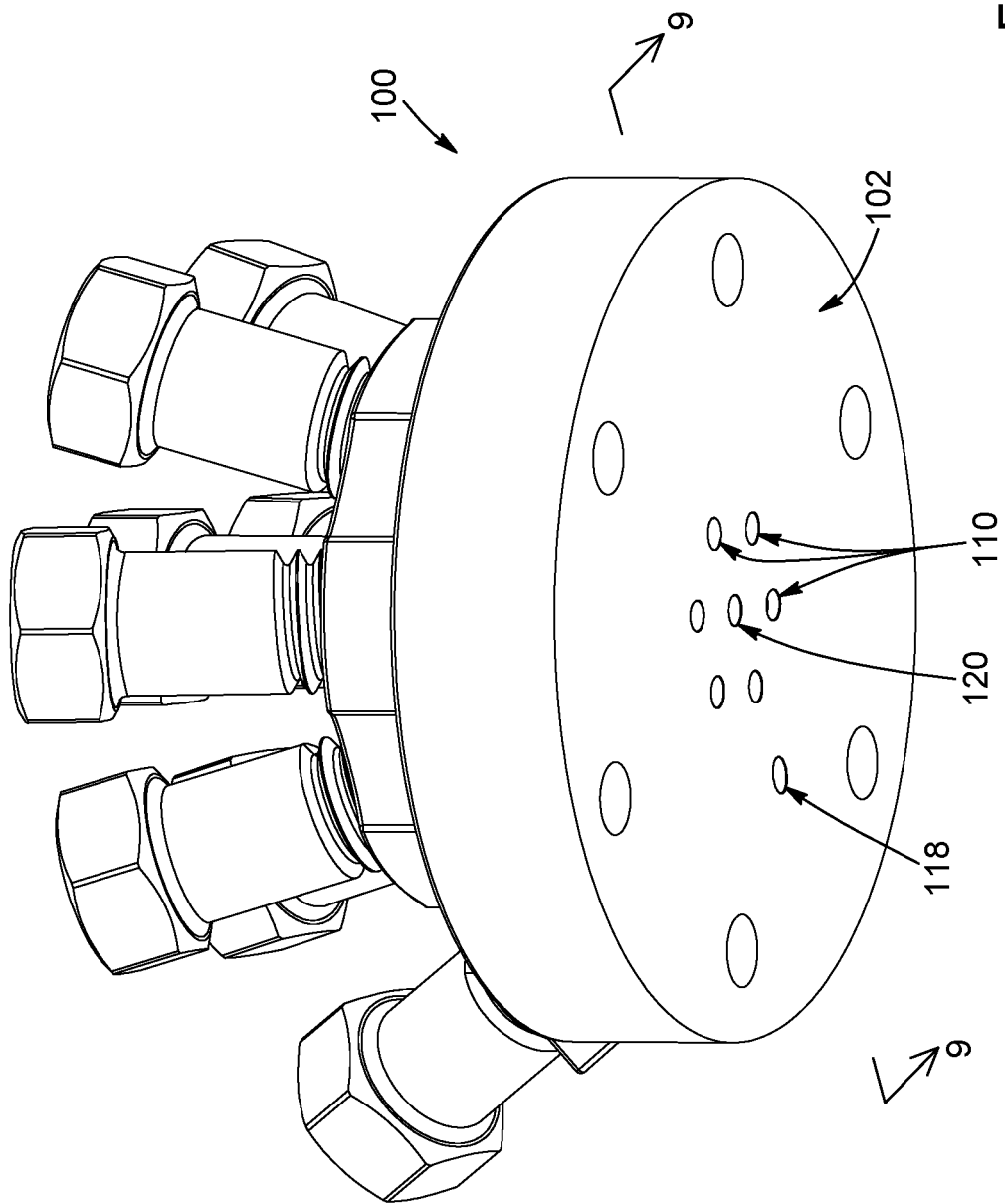
FIG. 8 is a bottom perspective view of a static body of the valve of FIG. 6, showing static ports defined on a flat surface thereof, according to an embodiment.
Figure 9:
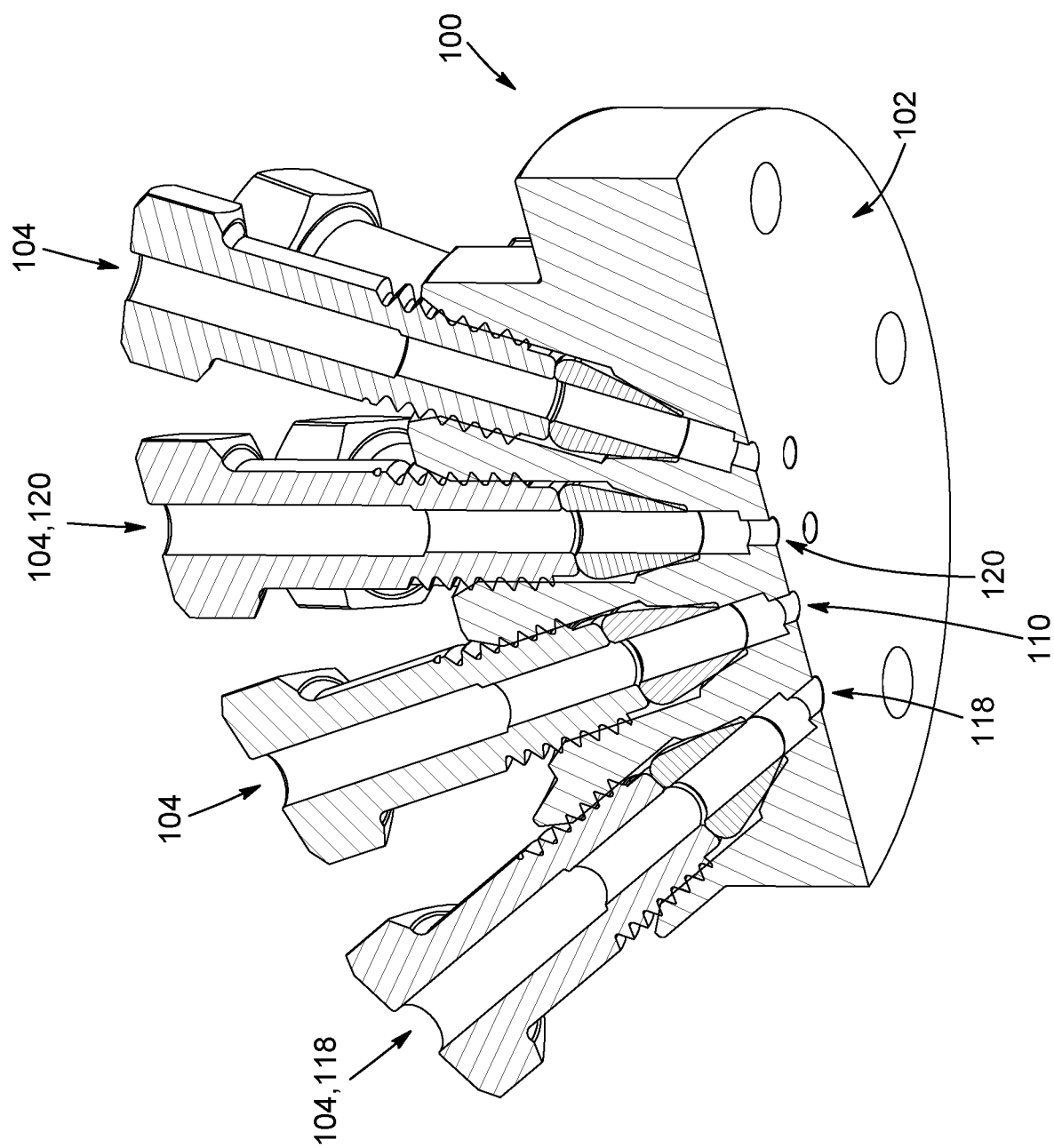
FIG. 9 is a cross-section view of the body shown in FIG. 8.

As with the linear valve, the embodiments of the rotary valve 10 includes a pressing assembly 500. As seen in FIG. 7, the pressing assembly 500 can include different parts to press/push the movable assembly 200 against the static body 100. For example, the pressing assembly 500 can include Belleville washers 504, compressed by an adjusting pressure means, such as a pressure nut 516, threadedly engaged in the enclosure 600, to compress or decompress the Belleville washers 504 depending on the pressure required for the application. A pressure nut lever arm 514 can be rotated to move the pressure nut 516 toward or away from the disk plate 208, to adjust the pressure/force applied on the disk plate 208. Roller bearings 518 can also be provided in the enclosure, located between the Belleville washers 504 and the pressure nut 516. In alternate embodiments, it is possible to provide automatic pressure adjusting means, which would reduce the sealing pressure applied to the movable assembly toward the fixed body 100, when the disk plate 208 is moved from a first to a second operating position, and to increase the sealing pressure applied when the static ports 110 is in an operating position, facing the slide/cartridge ports. It is also possible to apply a sealing intermediate pressure, between a reduced load and a full load, to maintain adequate sealing even when the movable assembly is moved between two operating positions. Also, it is possible to adjust the actuating force, which allows moving the movable assembly 200, according to the operating temperature of the valve.

Figure 22:
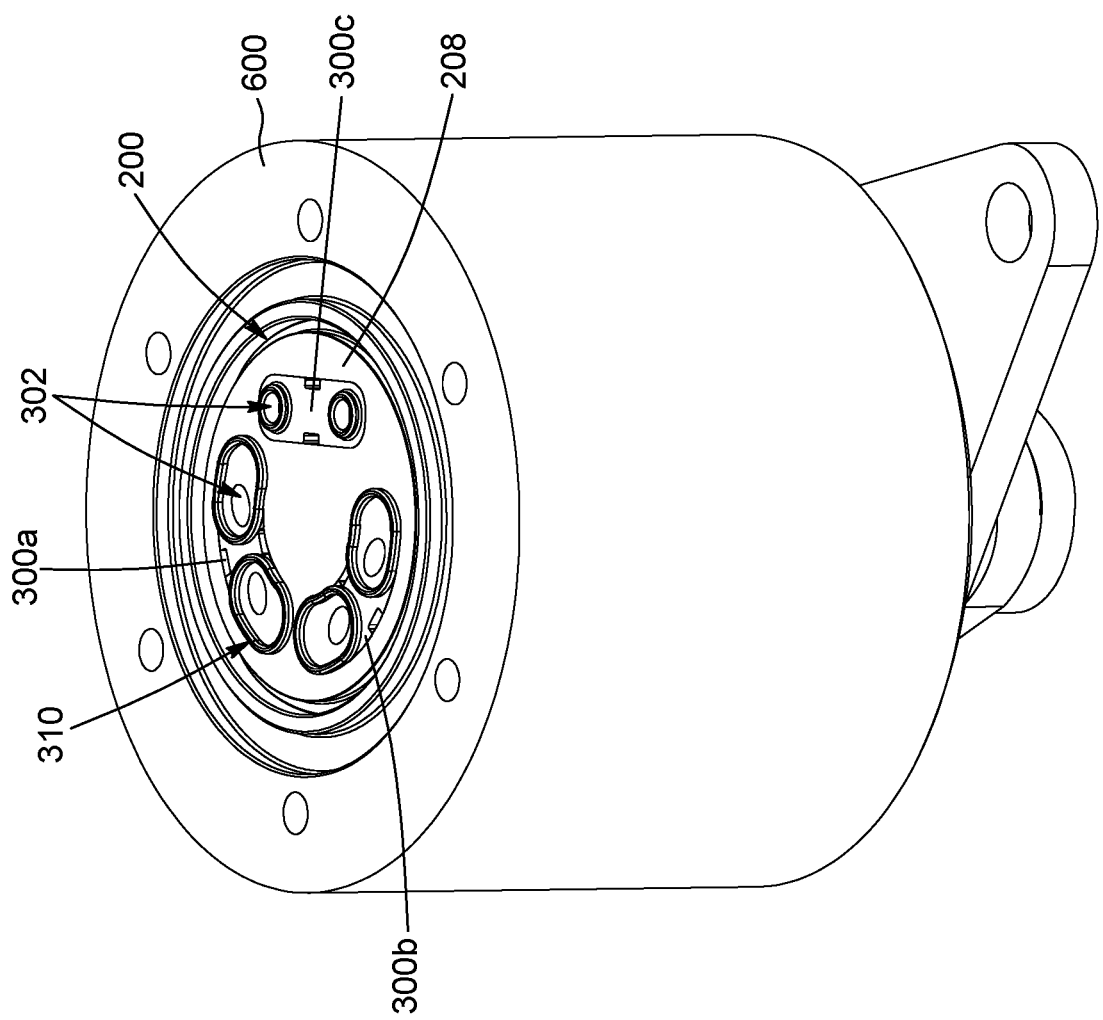
FIG. 22 is a perspective view of another possible embodiment of the movable assembly, showing a pair of arcuate cartridges, and a linear sampling cartridge.
Figure 23A:
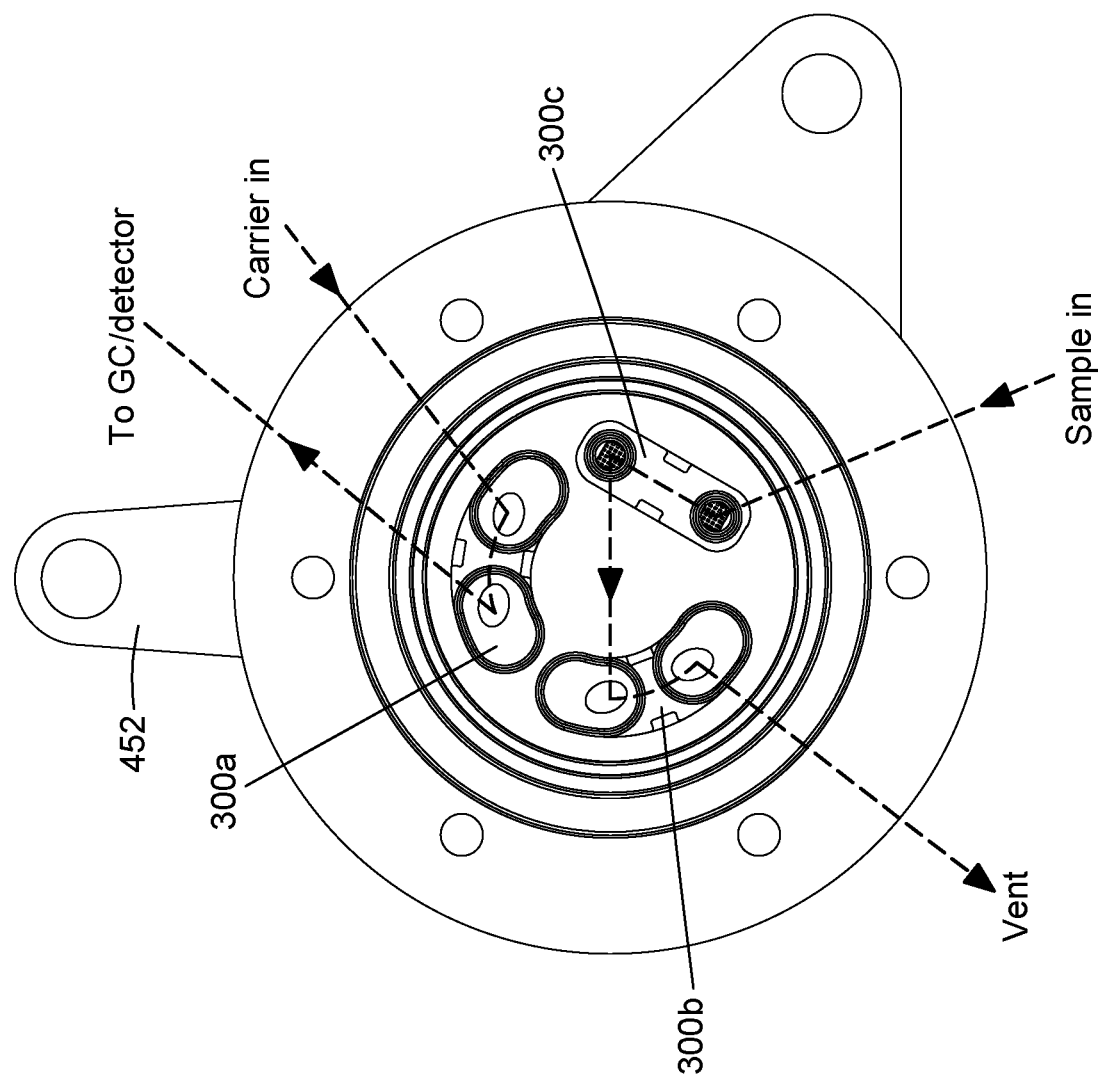
FIGS. 23A to 23C show the movable assembly of FIG. 22 being operated in different modes, according to a position of the movable assembly.
Figure 23B:
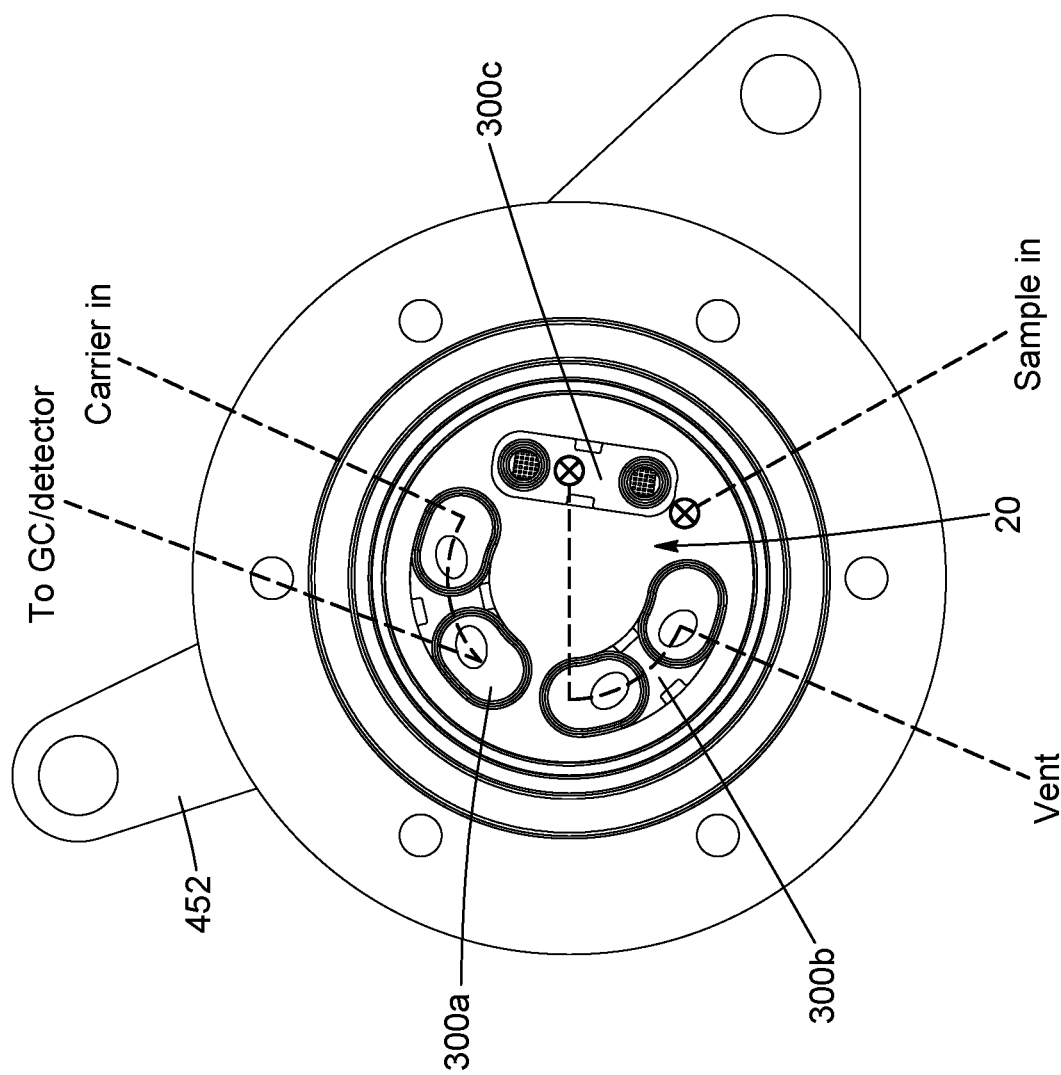
Figure 23C:
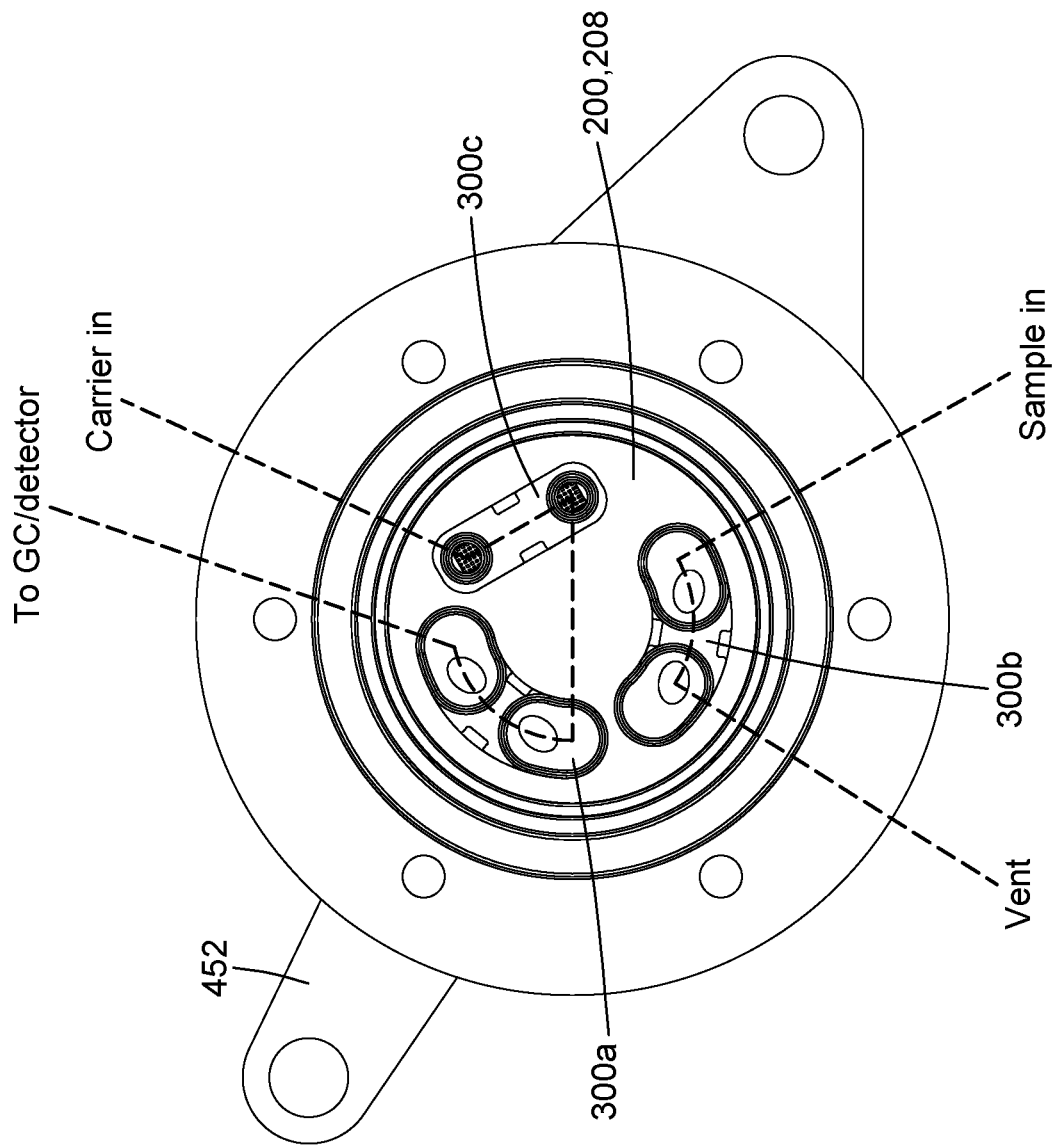

Referring now to FIGS. 22 to 23C, yet another possible embodiment of the movable assembly 200 is provided. For applications where the cartridge channels are used as sample loops, the valve can be moved in an intermediate position (see FIG. 23B), in which some of the ports are facing or positioned in between two cartridge ports 302. In this case, the cartridge ports from the cartridges which are not part of the sample loop have an oval shape, and/or are surrounded by an oval-shaped annular lip 310, following an arc shape. As best seen in FIG. 22, two of the tree cartridges have an arc-shape (300a, 300b), while the third cartridge (300c) used as a sample loop (which can be referred as the sampling cartridge) has a substantially rectangular, or oblong shape. This allows actuating the valve in the intermediate position to isolate the fluid within the sampling cartridge and vaporize the fluid therein before proceeding with the subsequent fluid injection.

The oval-shaped ports (or annular lips 310) from the other cartridges allow maintaining the flow in the ports in the intermediate position. As such, it is appreciated that other shapes can be suitable for the ports and/or the annular lips, such as oblong or rectangular for example. FIGS. 23A-23C show the valve with the actuation lever 452 positioned at 0, 20 and 60 degrees respectively, with the intermediate position being the one represented by FIG. 23B. In FIGS. 23A and 23C, the movable assembly is positioned such that the static ports are in fluid communication with the cartridge ports. The intermediate position can allow the cartridges to be heated, if needed, by positioning the movable assembly in between operating positions such that some of the static ports are facing in between the cartridge ports (i.e., are blocked). Then, when in operation, sample fluid circulating in the channel of the heated cartridge would vaporize at the contact of the heated sidewalls of the channel.

Figure 24A:
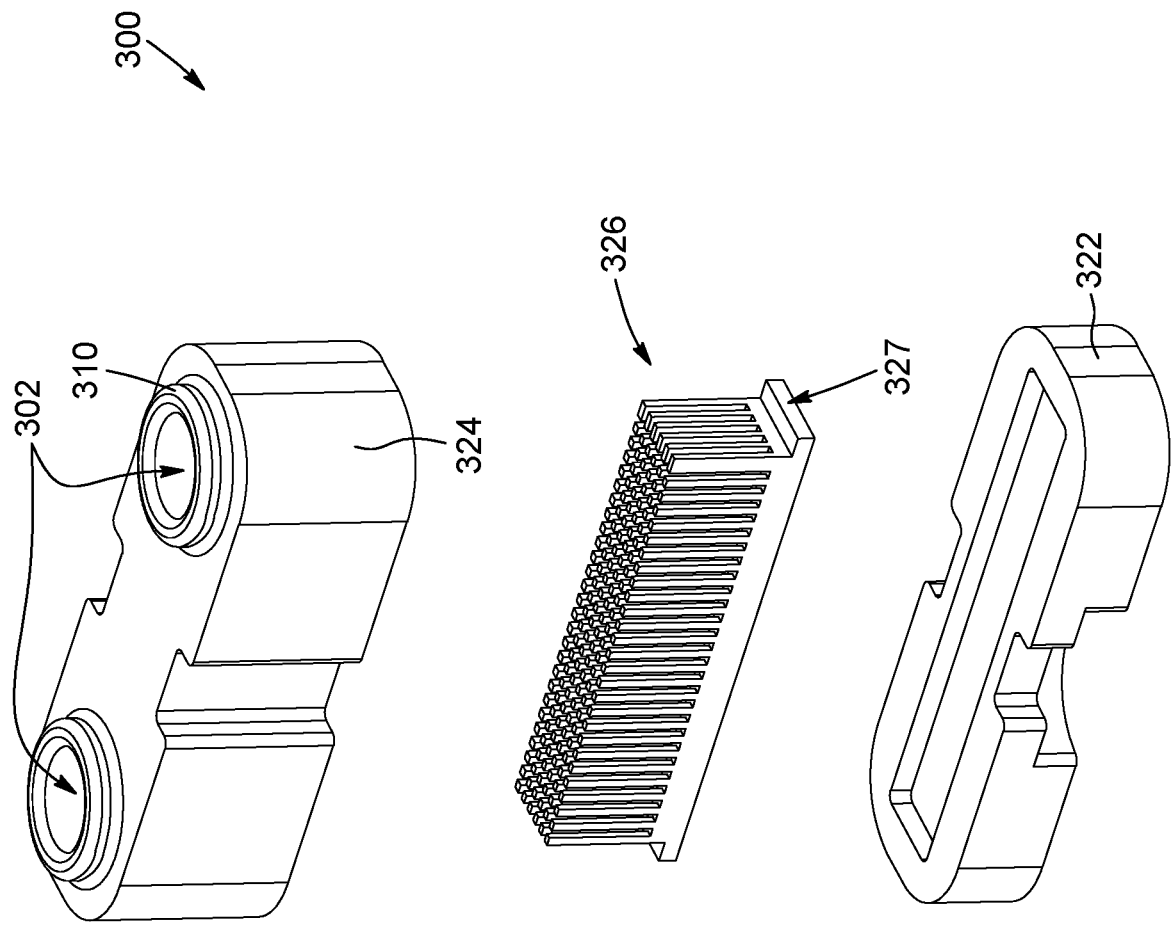
FIGS. 24A and 24B are top and bottom perspective views of a sampling cartridge according to a possible embodiment, for use in the movable assembly of FIG. 22, showing a concentrator positionable within a sampling cavity of the cartridge.
Figure 24B:
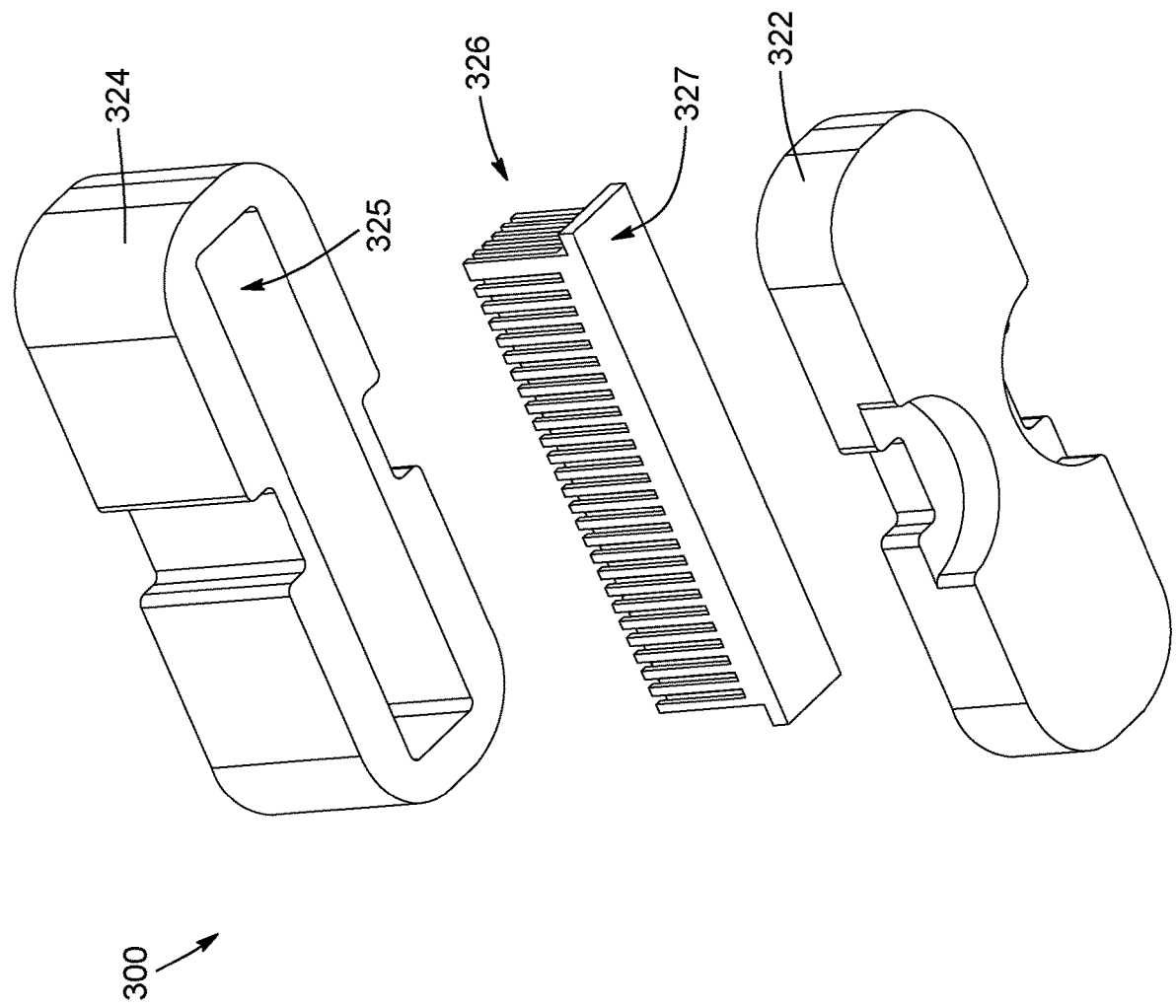

A possible embodiment of a cartridge or insert which can be used as a sampling cartridge is shown in FIGS. 24A and 24B. As can be appreciated, the sampling cartridge 300 includes a pair of first and second cartridge ports 302, provided with annular lips 310. But in this case, the cartridge channel 306 linking the two ports includes a cavity 325, or chamber, forming a sampling volume, or sampling chamber. Optionally, the sampling cavity 325 can receive a concentrator 326 (or micro pre-concentrator) with is preferably made of a porous material, or have a porous, comb-like or mesh-like configuration, to "trap" the fluid circulating therein. A catalyst can also be used to coat the sidewalls of the sampling cavity 325 or added to the concentrator 326. Different types of materials can be selected depending the fluid to analyze. The cartridge 300 can be made of two parts, a base 322 and a body or cartridge house 324, designed to form the cartridge channel (e.g., sampling cavity 325) when assembled, and allowing to insert the concentrator 326 if needed. The base and/or the concentrator can include or be connected to heating elements 327, allowing to heat the cartridge 300, channel 306 and/or pre-concentrator, so as that the fluid is vaporized when circulating within the sampling cartridge. For example, the heating element can include resistive wires integrated in the concentrator and/or in the body of the cartridge, such as in the base 322. A seal can be placed between the base and the body of the cartridge to seal the sampling cavity 325. Optionally, the sampling cartridge can be made of a ceramic, such as "Macor"'s machinable glass ceramic. In this case, the annular lips 310 can be made of rubber or polymeric O-ring seals.

The possible embodiments of the valve 10 allows operating the valve in different modes, including the more "conventional" modes such as sampling and injection modes, but a third mode of operation is possible, a "vaporizing" mode, which allows heating the cartridge to vaporize the sample, as described above. In the exemplary embodiment of FIG. 23A, the valve is positioned in the sampling mode, in which the carrier gas is circulated in the first cartridge 300a, then to a GC column and finally to a detector; and the sample gas is circulated from cartridge 300b to cartridge 300c. In this mode, the sampling cartridge 300c, which includes the concentrator 326, is at sampling temperature Ts.

In FIG. 23B, the rotor has been rotated, for example by 20°, and the valve is positioned in the intermediate position, allowing the valve to be used in a "vaporizing" mode. The carrier gas continues to be circulated in the first cartridge 300a, then to the detector; but in this case, the sample gas injection can be stopped or alternatively, can be circulated from cartridge 300b to the sealed space 20 between the static body and movable assembly, and can be purged outside the valve. During this time, the sampling insert 300c is isolated, and can be heated at a predetermined temperature Tv (or "vaporizing temperature"), higher than the sampling temperature, which may also correspond to the release temperature of the concentrator 326.

Then, as shown in FIG. 23C, the valve is positioned in the second position, placing the valve in the "injection mode", where the sampling insert 300c is now in series (or in fluid communication) with the detector, such that the carrier gas can "collect" and push the vaporized sample gas toward the GC column and detector.

Figure 25:
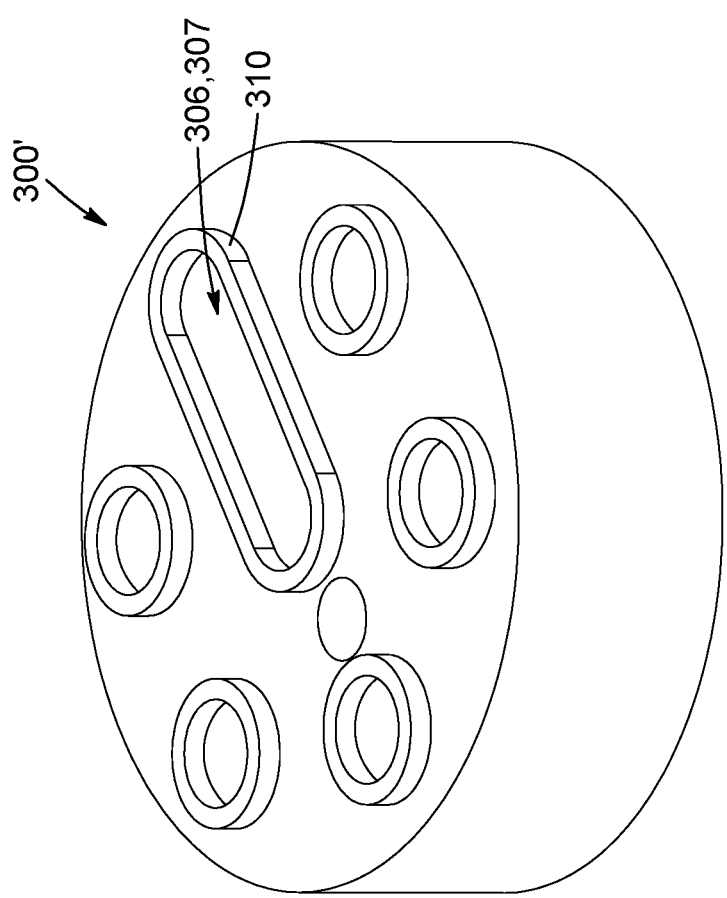
FIG. 25 is a perspective view of another embodiment of the cartridge, showing a single recess defined on the top surface thereof.
Figure 26:
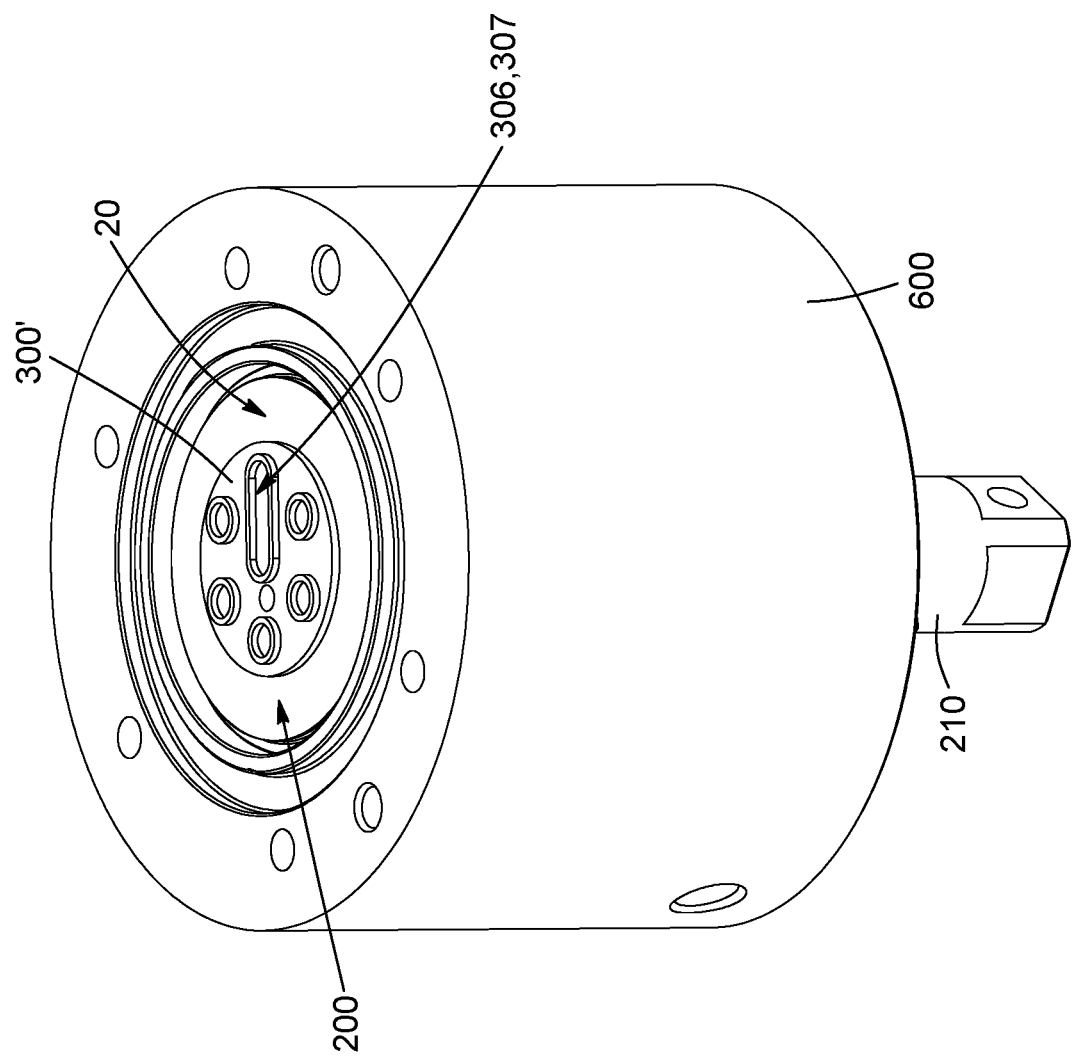
FIG. 26 is a perspective view of a movable assembly provided with the cartridge of FIG. 25.

Now referring to FIGS. 25 and 26, the single cartridge 300' can be provided with a single channel 306, which in this embodiment includes a recess 307. Therefore, it is appreciated that a single flow of fluid can circulate through the valve at any given time via the single channel 306. In this embodiment, the passages of the static body include a sample valve output located substantially in the center thereof such that the channel 306 remains in fluid communication therewith in the various operating positions. The single channel 306 therefore establishes fluid communication between a selected one of the static ports and the valve output, while the remaining static ports are blocked and/or prevented from communicating with the valve output and/or the other static ports.

As can be appreciated, the improved slide valve provides several advantages. It provides an alternative to existing slide valve, which are difficult to manufacture because large/wide areas must be made as flat and even as possible, within tight tolerances. The provision of raised/protruding annular lips or ridges surrounding the ports greatly reduces the area that need to be flat and even, since only the raised lips will contact the fixed body. The use of resilient means underneath the cartridges further alleviates any issue with flatness or evenness, since the cartridges are urged and pressed toward the fixed body. It is appreciated that, although the above embodiments are described in relation to six-port valves and ten-port valves, the valves can include any suitable number of ports useful in fluid analysis operations for example.

A coating provided on the lips only can further reduce friction and/or improve the resistance to wear. In addition, providing the movable assembly with replaceable/removable cartridges/inserts allows selecting the proper material properties for limited components in the valve—i.e. to only those in contact with the sample or carrier gas. The remaining portions the movable assembly can be made of cheaper and/or more robust material. Providing removable cartridges also allows selecting the proper channel volume, depending on the applications, and also to heat selecting components of the valve, which are to contact the fluids to analyze. The cartridges can also receive sample concentrators and/or heating elements, if needed. It is appreciated that features of one of the above described embodiments can be combined with the other embodiments or alternative thereof.

Moreover, although the embodiments of the valve and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the valve, as it is briefly explained herein and as can be easily inferred herefrom by a person skilled in the art. Moreover, it is appreciated that positional descriptions such as "above", "below", "left", "right" and the like should, unless otherwise indicated, be taken in the context of the figures and should not be considered limiting.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the invention.

The invention claimed is:

1. A chromatography valve for use in fluid analysis and chromatography applications, the chromatography valve comprising:
 a first body having a flat face, the first body being provided with passages extending therein, each passage being connectable at an outer end to tubing, and terminating at an inner end in a passage port opening on said flat face;
 a second body engaged with the first body in a sealed relationship, one of the first and second bodies being movable relative to the other one of the first and second bodies between two or more positions for controlling fluid circulation between the passages of the first body, the second body comprising at least one cartridge receiving cavity;
 at least one cartridge provided in the at least one cartridge receiving cavity of the second body, the at least one cartridge comprising at least one channel in fluid communication with a pair of the passage ports of the first body, depending on the position of the first body relative to the second body, thereby channeling fluid through selected ones of the passages via the at least one channel;
 the at least one cartridge comprising a front face facing the flat face of the first body, and further comprises at least one annular lip protruding from the front face of the cartridge and surrounding the at least one channel, the annular lip being in contact and pressed against the flat face;
 the at least one cartridge comprising purge channels extending radially between adjacent channels; and
 the first body comprising a plurality of purge pockets defined on the flat face and facing the purge channels to allow fluid communication between an inner section and an outer section of the second body.

2. The chromatography valve according to claim 1, wherein the at least one channel corresponds to a recess defined on the front face of the at least one cartridge, for establishing fluid communication between two passages of the first body.

3. The chromatography valve according to claim 2, wherein the at least one cartridge comprises a single cartridge, and wherein the at least one cartridge receiving cavity comprises a single cartridge receiving cavity for receiving the single cartridge and wherein the single cartridge comprises a plurality of channels.

4. The chromatography valve according to claim 3, wherein one or more of the channels are of different volumes for allowing the channels to be used as selected sample loops.

5. The chromatography valve according to claim 1, wherein the at least one channel extends within the cartridge and comprises a pair of cartridge ports at opposite ends of the channel, the cartridge ports opening on a front face of the cartridge and facing the passage ports for establishing fluid communication between two passages of the first body.

6. The chromatography valve according to claim 5, further comprising at least one annular lip shaped and configured to surround each or both of the cartridge ports.

7. The chromatography valve according to claim 6, wherein the annular lips surrounding at least one pair of cartridge ports has an oval-shape, and wherein the annular lips surrounding another pair of cartridge ports is substantially circular.

8. The chromatography valve according to claim 1, wherein the at least one cartridge comprises a rear face opposite the front face, the rear face being provided with a flex point for properly seating the at least one cartridge in the at least one cartridge receiving cavity.

9. The chromatography valve according to claim 1, wherein the annular lip has tapered inner and outer sides, and an apex, the apex being in sealing contact with annular regions surrounding the passage ports of the first body, in selected ones of the two or more positions.

10. The chromatography valve according to claim 1, wherein the annular lip is provided with an inert coating.

11. The chromatography valve according to claim 1, comprising a sealing ring surrounding the passage ports and the at least one cartridge, thereby creating a sealed space between the first and second bodies.

12. The chromatography valve according to claim 11, further comprising an enclosure for enclosing the first body and/or the second body, and wherein the first body, the enclosure and/or the second body comprises a seal groove for receiving the sealing ring therein.

13. The chromatography valve according to claim 11, wherein the passages comprise a purge inlet and a purge outlet, for purging impurities from the sealed space.

14. The chromatography valve according to claim 13, wherein the purge outlet is wider than the remaining passage ports to mitigate internal pressurisation upon actuation of the valve.

15. The chromatography valve according to claim 1, wherein the at least one cartridge comprises a sampling cartridge, and wherein the channel of the sampling cartridge comprises a sampling cavity.

16. The chromatography valve according to claim 1, wherein the at least one channel is arc shaped.

17. The chromatography valve according to claim 1, wherein the at least one cartridge comprises a plurality of cartridges, and wherein the at least one cartridge receiving cavity of the second body comprises a plurality of cartridge receiving cavities for receiving a corresponding one of the plurality of cartridges.

18. The chromatography valve according to claim 1, wherein a single channel is in fluid communication with the passages of the first body at a given time to allow fluid analysis of a selected fluid circulated through selected ones of the passages of the first body.

19. The chromatography valve according to claim 1, comprising a pressing assembly adapted to press the first body and the second body against each other.

20. The chromatography valve according to claim 19, comprising pressure adjusting means, for varying the sealing force applied by the pressing assembly.

21. The chromatography valve according to claim 1, comprising an actuating assembly for sliding or rotating one of the first and second bodies between the two or more positions.

22. The chromatography valve according to claim 21, wherein the actuating assembly comprises a rotary assembly operatively connected to the second body for rotating the at least one cartridge relative to the first body.

23. The chromatography valve according to claim 1, wherein the at least one cartridge is removably provided in the at least one cartridge receiving cavity of the second body.

* * * * *